(12) United States Patent
Edmark

(10) Patent No.: US 6,351,262 B1
(45) Date of Patent: Feb. 26, 2002

(54) DISPLAY TECHNIQUES FOR THREE-DIMENSIONAL VIRTUAL REALITY

(75) Inventor: John T. Edmark, New York City, NY (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/190,743

(22) Filed: Nov. 12, 1998

Related U.S. Application Data

(63) Continuation-in-part of application No. 09/160,758, filed on Sep. 25, 1998, now Pat. No. 6,236,402, which is a continuation-in-part of application No. 09/107,059, filed on Jun. 30, 1998, now Pat. No. 6,229,548.

(51) Int. Cl.[7] ............................................. G06F 15/00
(52) U.S. Cl. ...................................................... 345/427
(58) Field of Search ................................ 345/419, 426, 345/427, 428, 585, 586, 587

(56) References Cited

U.S. PATENT DOCUMENTS 5,519,823 A * 5/1996 Barkans ..................... 345/443
5,706,481 A * 1/1998 Hannah et al. ............. 345/519

OTHER PUBLICATIONS

Youichi Horry et al., "Tour Into The Picture: Using A SPidery Mesh Interface To MAke ANimation From A Single Image," Computer Graphics Proceedings, Annual Conference Series, 1997, pp. 225–232.

* cited by examiner

Primary Examiner—Phu K. Nguyen
(74) Attorney, Agent, or Firm—J. Delarosa

(57) ABSTRACT

A limitation of using two-dimensional images, such as videos or photographs, to represent portions of a three-dimensional world occurs when the user moves within the world and views the world from a location different than from the original context of the two-dimensional image, i.e., from a location different than the image's ideal viewing point (IVP). View changes result in the image not aligning well with the surrounding objects of the three-dimensional world. This limitation is overcome by distorting the two-dimensional image so as to adjust the image's vanishing point(s) in accordance with the movement of the user using a pyramidic panel structure. In this manner, as the user moves away from the ideal viewing point, the distortions act to limit the discontinuities between the two-dimensional image and its surroundings. Various pyramidic panel structures may be constructed, including an octahedral panel structure which surrounds the user's view point so as to provide a so-called "plenoptic" view of the world. Also, to minimize the depth profile of the pyramidic panel structure, the structure may be segmented into sections and each section translated towards, or away from, the user's viewpoint. Also, a hierarchical image resolution may be used, with portions of the image near the center or vanishing point having a higher resolution than portions of the image near its perimeter.

25 Claims, 18 Drawing Sheets

DISPLAY TECHNIQUES FOR THREE-DIMENSIONAL VIRTUAL REALITY

CROSS-REFERENCE TO RELATED APPLICATION

This application is related to co-pending U.S. patent application Ser. No. 09/191,012, filed concurrently herewith (Case Edmark-6). Also, this application is a continuation-in-part of U.S. patent application Ser. No. 09/160,758 filed Sep. 25, 1998 now U.S. Pat. No. 6,236,402 (Case Edmark-5), which is a continuation-in-part of U.S. patent application Ser. No. 09/107,059 filed Jun. 30, 1998 now U.S. Pat. No. 6,229,548 (Case Edmark-2). The above-identified co-pending applications, which are commonly assigned, are incorporated herein by reference.

TECHNICAL FIELD

This invention relates to the integration of three-dimensional computer graphics and a two-dimensional image to provide a realistic three-dimensional virtual reality experience.

BACKGROUND OF THE INVENTION

The display of a three-dimensional virtual reality world to a user requires considerable computation power, and it is typically costly to develop the necessary highly detailed models required for doing so. In order to simplify the problem, two-dimensional images, such as videos or photographs, may be used to represent or simulate portions of the three-dimensional world. A great reduction in computation power and cost can be achieved by such an arrangement.

SUMMARY OF THE INVENTION

A limitation of such a world occurs when a user moves within the world and views the world from a location different than the original context of a two-dimensional image which has been carefully calibrated to "fit into" the world. View changes, such as from a location different than the image's ideal viewing point, result in the image not aligning or fitting well with the surrounding objects of the three-dimensional world. I have recognized that, in accordance with the principles of the invention, viewpoint changes may be dealt with by distorting the two-dimensional image so as to adjust the image's vanishing point(s) in accordance with the movement of the user using a novel "pyramidic panel structure." In this manner, as the user moves away from the ideal viewing point, the distortions act to limit the discontinuities between the two-dimensional image and the surroundings of the world. Various pyramidic panel structures may be constructed, including an octahedral panel structure which surrounds the user's view point so as to provide the user with a so-called "plenoptic" view of the world.

In another aspect of the present invention, the pyramidic panel structure may be segmented into sections, each translated towards or away from the user's viewpoint and then scaled, so as to minimize the depth profile of the pyramidic panel structure. In yet still another aspect of the present invention, a hierarchical image resolution may be used, with portions of the image near the center of the image having a higher resolution than portions of the image near its perimeter.

DETAILED DESCRIPTION

Figure 1:
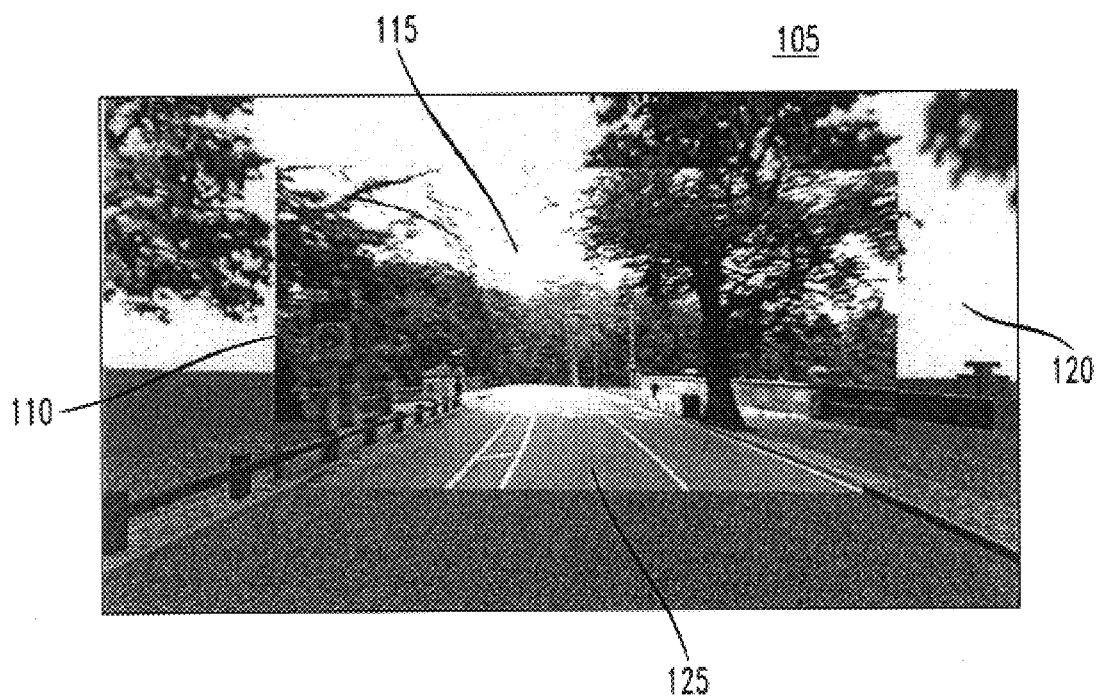
FIG. 1 shows an example of that which a user sees when a user views the world from the ideal viewing point for a two-dimensional image representing a portion of the world.
Figure 2:
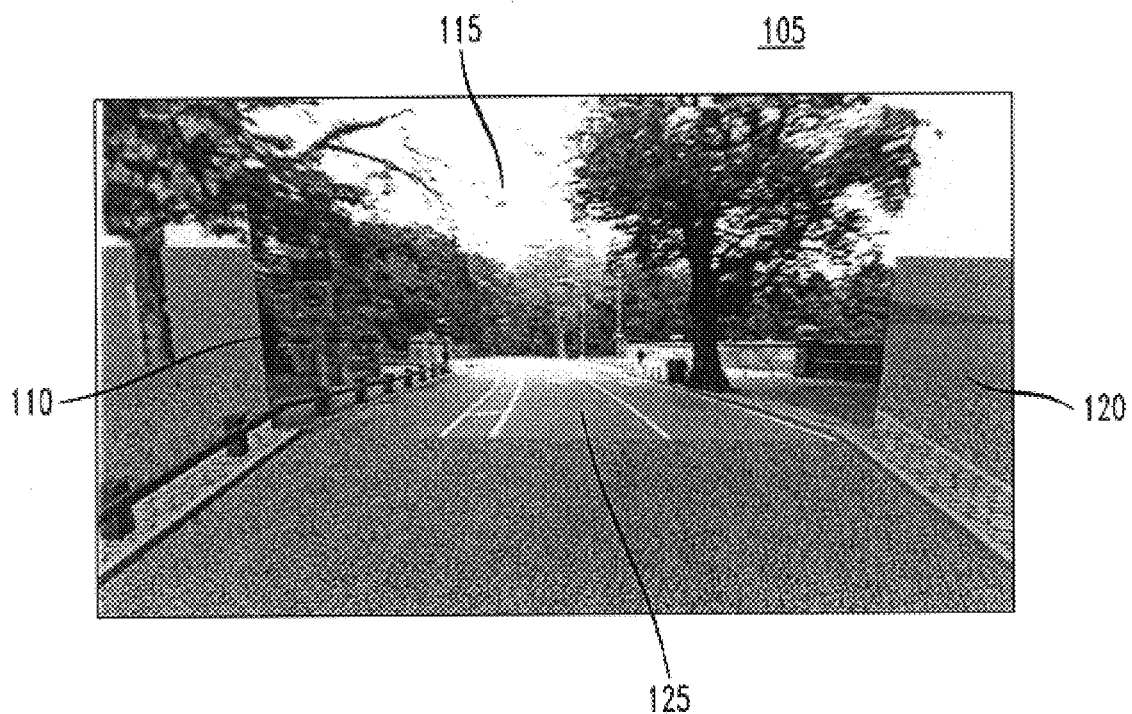
FIG. 2 shows an example of that which a user sees when a user moves within the world of FIG. 1 and views the two-dimensional image from a location different than the image's ideal viewing point, without the use of the present invention.

To better understand the invention, FIGS. 1–2 show examples of that which a user sees when the user moves within a three-dimensional virtual reality world (x,y,z) and views a two-dimensional image (x,y) representing a portion of the world from a location at the image's ideal viewing point (IVP), and then from a different location, i.e., a location different than the original context of the image. It should be understood that the two-dimensional image has been carefully calibrated to "fit into" the surroundings of the world. For simplification of terminology purposes, we shall use the term two-dimensional image to denote either a video clip or a photograph. In accordance with the principles of the invention, as the user moves away from the ideal viewing point, discontinuities between the two-dimensional image and its surroundings are minimized by distorting the image according to the movement of the user.

FIG. 1 shows an exemplary three-dimensional reality world 105, which is a bicycle path in a park, e.g., Central Park in New York City. In representing world 105, the present invention exploits a characteristic common for images consisting of views looking down the center of roads, streets or paths, which is that they may be treated as perspective, corridor-like images, with features closer to the center of the image being farther away from the viewer along the z-axis. Accordingly, the bicycle path or road and its immediate vicinity are treated as a kind of three-dimensional, corridor-like image whose floor is formed by the roadbed, whose ceiling is formed by the sky, and whose sidewalls are formed by the roadside objects. In this manner, the principles of a simple point perspective can be used for distorting the landscape image in accordance with the movement of the viewer, as discussed herein below.

World 105 is divided into two portions, screen or panel 110 on which is shown or displayed a two-dimensional image 115, such as a still photograph, picture, or a current frame of a video clip; and the remainder of the world 120, which is represented using computer graphics techniques, and is thus referred to herein as computer graphics (CG Part) 120. Within CG Part 120 there are various synthetic, three-dimensional landscapes or objects modeled in, for example, the Virtual Reality Modeling Language (VRML). Two-dimensional image 115 simulates landscape or terrain portions of the world 105, here a virtual road or course 125 for walking, running or pedaling a bicycle.

Note that although three-dimensional world 105 cannot be actually rendered in a two-dimensional plane (x,y), it can be projected to and displayed on a two-dimensional plane so as to appear to have three dimensions (x,y,z). Accordingly, the techniques of the present invention are preferably employed with computers and software, which are sufficiently sophisticated to display images on a two-dimensional plane as having three dimensions. Note also that to make the world look realistic, computer graphics display techniques use the z component of objects to scale accordingly the x and y components as a function of its distance (z-axis) to the user's viewpoint.

Two-dimensional image 115 is carefully placed, cropped and sized to achieve continuity with the surrounding environment of the CG Part 120. Note that the image is clipped so that the left and right edges of the road in CG Part 120 pass through the left and right bottom corners of the road, respectively, in image 115. This clipping ensures that the roadbed maps to the floor of the hypothetical corridor. In so doing, portions at the boundary between two-dimensional image 115 and CG part 120 are co-planar, i.e., at the same distance away along the z-axis from the user's viewpoint. In "fitting" two-dimensional image 115 to CG part 120, however, there exits only one viewpoint from which that image's content properly corresponds to the surrounding environment of CG Part 120. This unique location is called the image's ideal viewing point (IVP). In FIG. 1, two-dimensional image 115 is seen from its ideal viewing point, and from this view, image 115 aligns well with the surrounding objects of CG Part 120.

Users, however, rarely view image 115 only from its idea viewing point. As the user moves within world 105, such as left or right of road 125, as they round curves, or move closer to or farther from the image, they see image 115 from positions other than its ideal viewing point. Absent the use of the present invention, such viewpoint changes would cause objects or features within image 115 to align improperly with the surrounding environment, as further illustrated in FIG. 2.

In accordance with the principles of the invention, however, screen or panel 110 uses a display structure called a "pyramidic panel structure" for displaying two-dimensional image 115 within the surrounding three-dimensional space of the CG Part 105 so as to deal with viewpoint changes. The transformations associated with the pyramidic panel structure dynamically distort two-dimensional image 115 according to viewer's position so as to adjust the image's vanishing point with the viewer's movement. As the viewer moves from the image's ideal viewing point, these distortions act to limit discontinuities between image 115 and the surroundings of CG Part 120.

Figure 3:
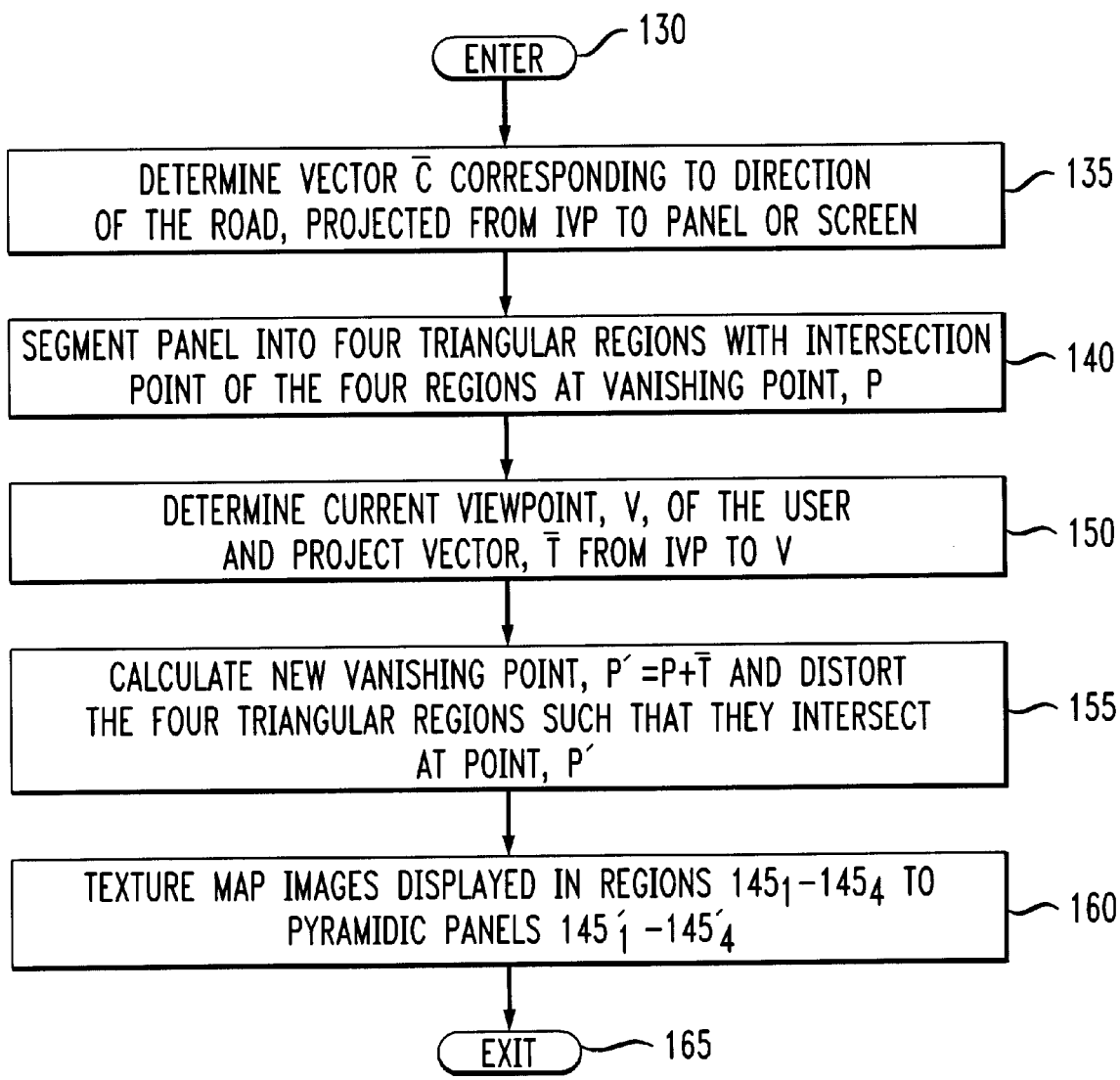
FIG. 3 shows an exemplary process, in accordance with the principles of the invention, for distorting the two-dimensional image using a pyramidic panel structure so as to adjust the image's vanishing point in accordance with the movement of the user.

FIG. 3 shows an exemplary process in accordance with the principles of the invention for distorting two-dimensional image 115 so as to adjust its vanishing point in accordance with the viewer's position. The process is entered at step 130 whenever it is determined that the viewer's position has changed.

Figure 4:
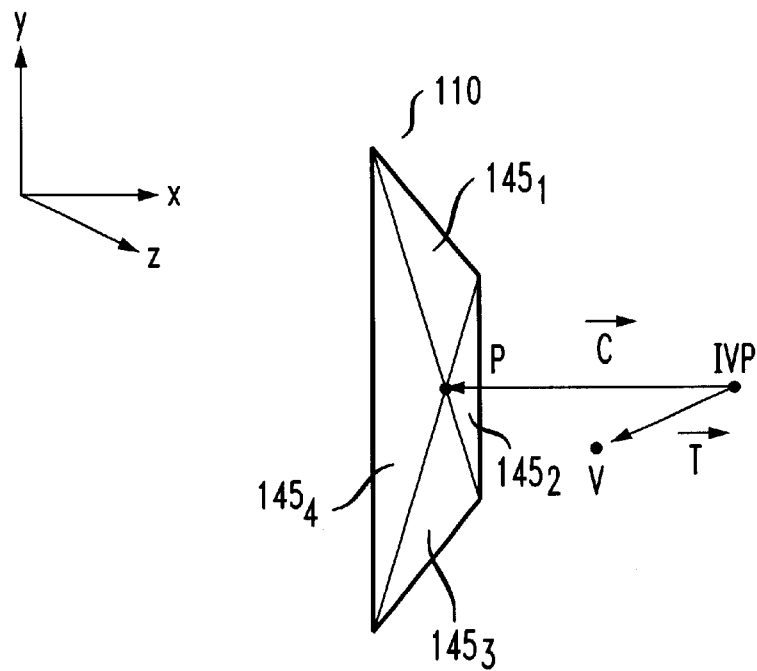
FIGS. 4 and 5 depict the pyramidic panel structure of the present invention for distorting the two-dimensional image so as to adjust the image's vanishing point, in accordance with the movement of the user.

Using the virtual world's road model of the CG Part 105, a vector, $\overline{C}$, corresponding to the direction of road 125 is projected at step 135 from the image's ideal viewing point, IVP, to panel or screen 110 on which is displayed image 115. Note that the panel is two-dimensional, but represents three-dimensional space with objects nearer the center of the image being farther away from the plane of the viewer. The panel structure is shown in FIG. 4. The point of intersection with screen or panel 110 is the image's vanishing point, P. Note, however, that the vanishing point may be set visually by the user, if desired, or by other suitable computer graphics processing techniques known in the art. Next, in step 140, screen or panel 110 is segmented into four triangular regions $145_{1-4}$, one for each of the regions bordering CG Part 120, with the intersection point of the four regions located at the vanishing point, P.

Figure 5:
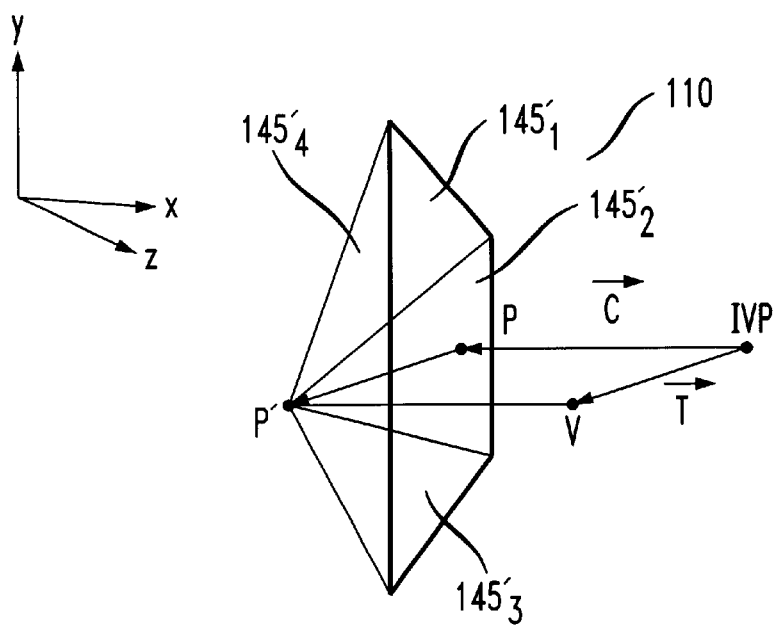

Thereafter in step 150, the current viewpoint of the user, V, is determined, and a vector $\overline{T}$ projected from the ideal viewing point, IVP, to the viewer's current location, V. In accordance with the principles of the invention, as the viewer moves, a new vanishing point P' is calculated as $P'=P+\overline{T}$. The four triangular regions $145_{1-4}$ are distorted in the three-dimensional space of the virtual world at step 155 to represent the mapping of objects nearer the center of the image being displaced farther away from the viewpoint of the user. The four triangular regions intersect at the new vanishing point P' and form so-called "pyramidic panels" $145'_{1-4}$. This is illustrated in FIG. 5. At step 160, the corresponding images displayed in regions $145_{1-4}$ are then "texture-mapped" onto pyramidic panels $145'_{1-4}$, respectively. In this manner, as the viewer moves away from the image's ideal viewing point, IVP, distortions in the image resulting from moving the image's vanishing point from P to P' act to limit the discontinuities between image 115 and the surroundings within CG Part 105.

In the exemplary illustration of FIG. 5, distorting image 115 so as to move the vanishing point from P to P' results in pyramidic panel structure forming a four-sided pyramid. Note that its base is fixed and corresponds to original screen or panel 110, with its peak located at P', which moves in concert with the viewer's current location, V. As the user's viewpoint moves closer to and farther from the image, the image's vanishing point accordingly moves farther from and closer to the user's viewpoint, respectively.

Figure 6A:
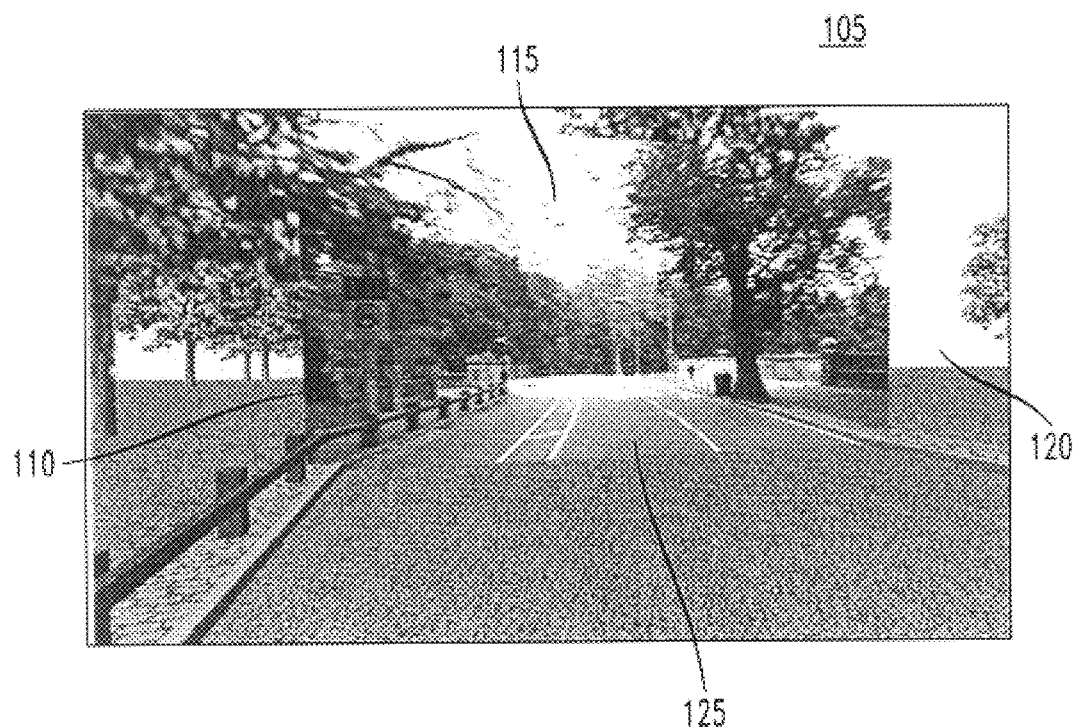
FIGS. 6A–B depict examples of that which a user sees when a user views the world from a location left of the image's ideal viewing point, without and with the use of the present invention, respectively.
Figure 6B:
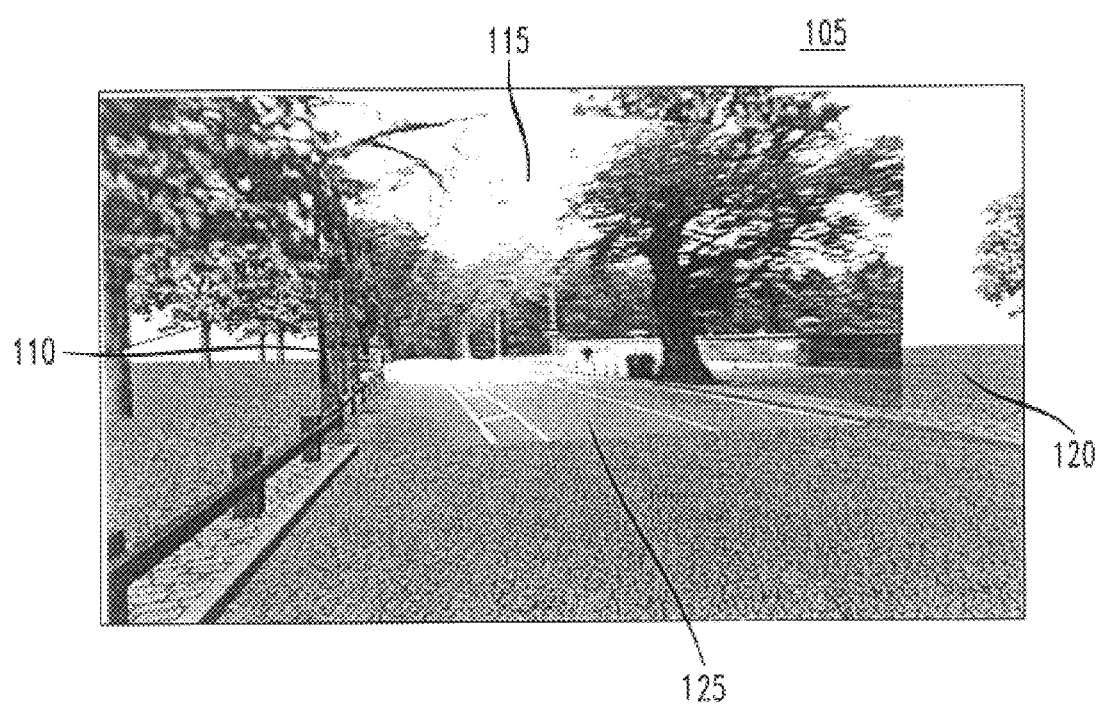
Figure 7A:
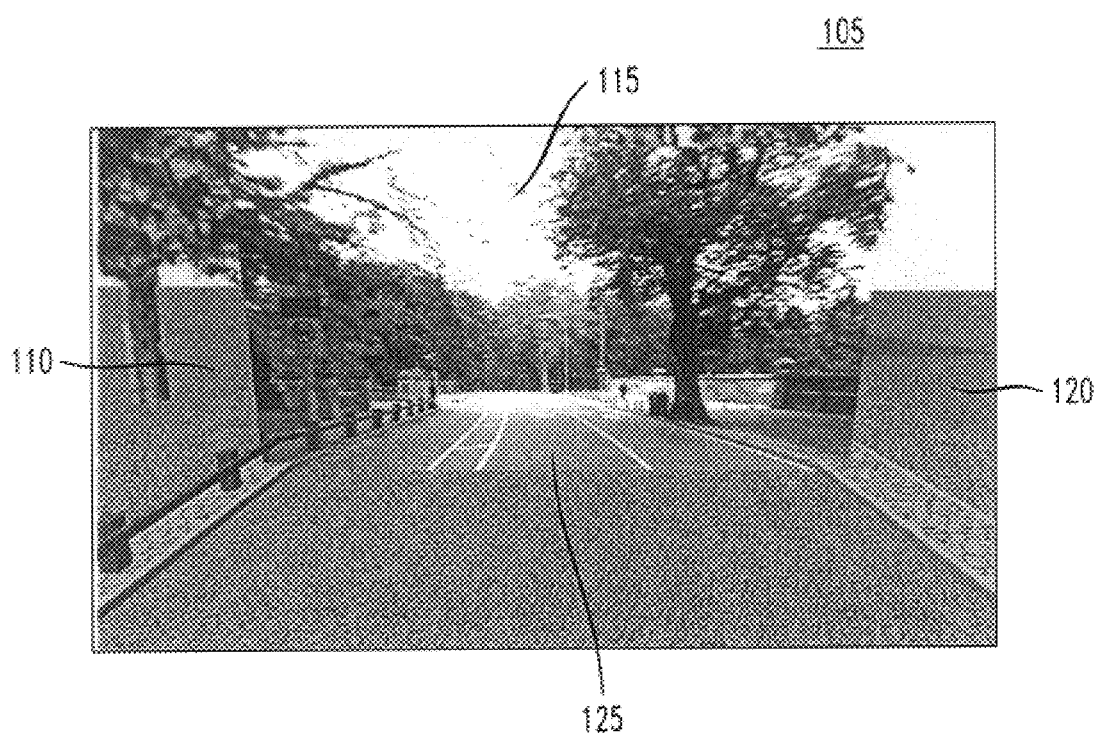
FIGS. 7A–B depict examples of that which a user sees when a user views the world from a location above the image's ideal viewing point, without and with the use of the present invention, respectively.
Figure 7B:
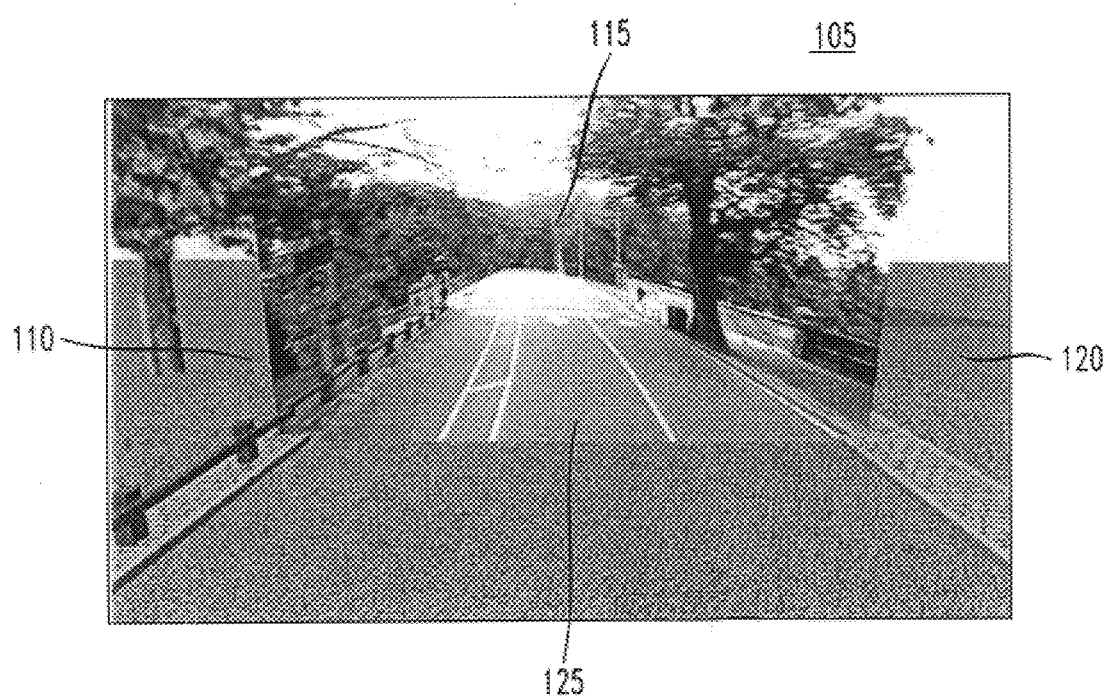
Figure 8A:
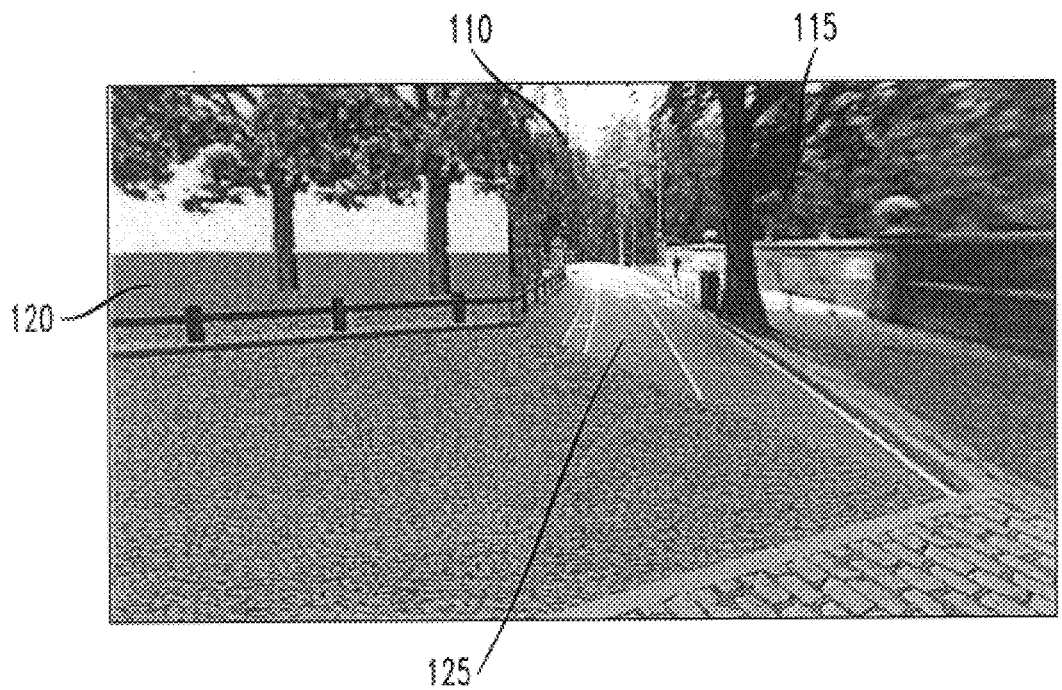
FIGS. 8A–B depict examples of that which a user sees when a user views the world from a location toward the front and the right of the image's ideal viewing point, without and with the use of the present invention, respectively.
Figure 8B:
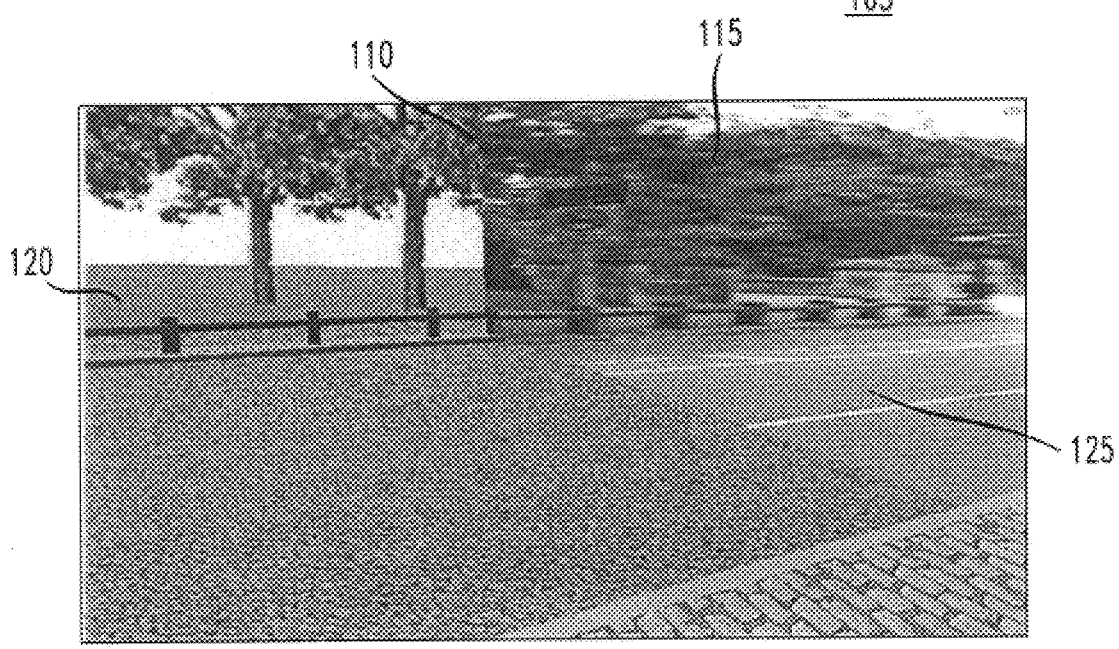

FIGS. 6 through 8 compare the display of two-dimensional image 115 on screen or panel 110 with the display of the same image using the "pyramidic" panels of the present invention. More specifically, FIGS. 6A, 7A and 8A depict viewing two-dimensional image 115 at a location from the left, above, and in front and to the right of the image's ideal viewing point, IVP, respectively, without the use of the present invention. In these latter figures, note that there are discontinuities between the edges of the road and the three-dimensional space of CG Part 105. FIGS. 6B, 7B and 8C depict the same two-dimensional image distorted and texture-mapped onto pyramidic panels $145'_{1-4}$, in accordance with the principles of the invention. Note that in these latter figures, the discontinuities in the road edge have been substantially eliminated.

Figure 9:
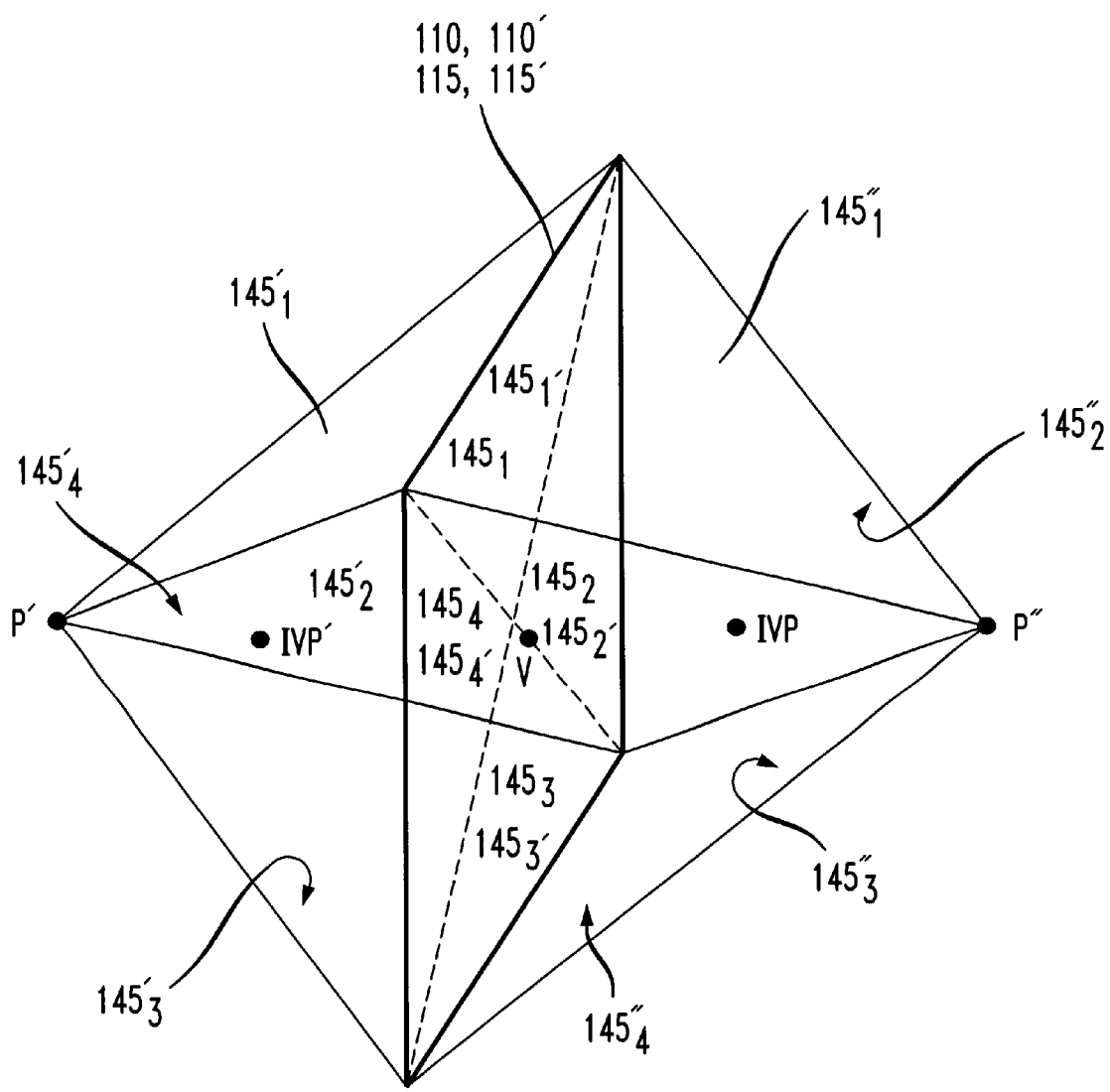
FIG. 9 depicts another embodiment of the pyramidic panel structure of the present invention.

Referring now to FIG. 9, there is illustrated another embodiment of the present invention which is similar to that of FIG. 5, except that two co-located image panels 110, and 110' are employed. Image panels 110 and 110' are of the same or similar size, shape and orientation, but face in opposite directions. As discussed herein below, image panels 110, 110' are employed to simulate a so-called "plenoptic" view, i.e., everything that is viewable in virtual world 120 to the user from his current viewpoint, V. More specifically, displayed on image panel 110 is two-dimensional image 115, which simulates portions of the various three-dimensional landscapes or objects that can be observed from the user's current viewpoint, V, in the virtual space defined by the rectangular coordinates (±x, ±y, -z). However, displayed on image panel 110' is two-dimensional image 115' which simulates the remaining portion of the "plenoptic view" or those three-dimensional landscapes or objects which can be observed from the user's current viewpoint, V, in the virtual space defined by the rectangular coordinates (±x, ±y, z). As such, what is observed by the user in virtual world 105, as a result of mapping image 115 or 115' onto image panel 110 or 110', respectively, is dependent on the direction from which the user views the virtual world. Using two image panels in effect entirely surrounds the user's viewpoint, V, within the virtual world so as to provide a "plenoptic view." Not only is the user able to pan along a 360° field of view along the x,y and z axes, but advantageously is also able to move within and around the world without noticeably observing any discontinuities in the world.

Importantly, panels 110 and 110' are similarly segmented into triangular regions $145_{1-4}$ and $145_{1'-4'}$, respectively, and use the "pyramidic panel structure" discussed herein above for displaying the two-dimensional images so as to deal with viewpoint changes. Recall that the transformations associated with the pyramidic panel structure dynamically distort the two-dimensional image according to the viewer's position so as to adjust the image's vanishing point in accordance with the viewer's movement. As the viewer moves from the image's ideal viewing point, these distortions act to limit discontinuities between the image, and the surroundings of the virtual world.

Note, however, that the respective views of two-dimensional images 115, 115' should be carefully selected so that the edges of the two views correspond to the same location in virtual world 105. In this manner, the two image panels can be attached at their edges, but facing in opposite directions. As discussed above, each panel is distorted in the three-dimensional space of the virtual world so as to represent the mapping of objects nearer the center of the image being displaced farther away from the viewpoint of the user. As the user moves from the ideal viewing point, IVP, of image 115, regions $145_{1-4}$ distort into panels $145'_{1-4}$, forming a four-sided pyramid. And, likewise, moving from the ideal viewing point, IVP' of image 115' results in regions $145_{1'-4'}$, distorting into panels $145''_{1-4}$, and forming another four-sided pyramid.

Figure 10:
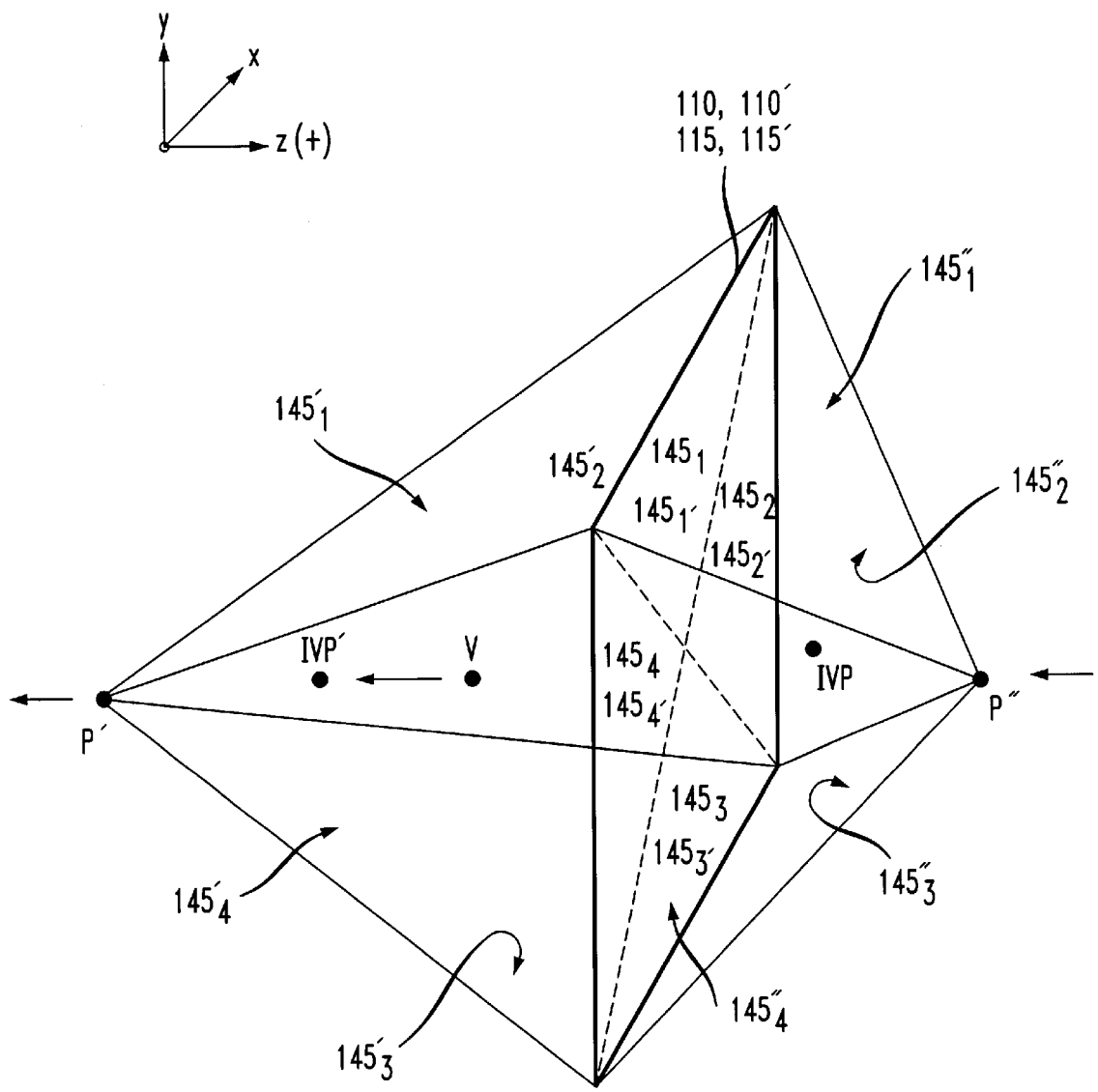
FIGS. 10–12 depict the pyramidic panel structure of FIG. 9 for various locations of the user's current viewing point, V.
Figure 11:
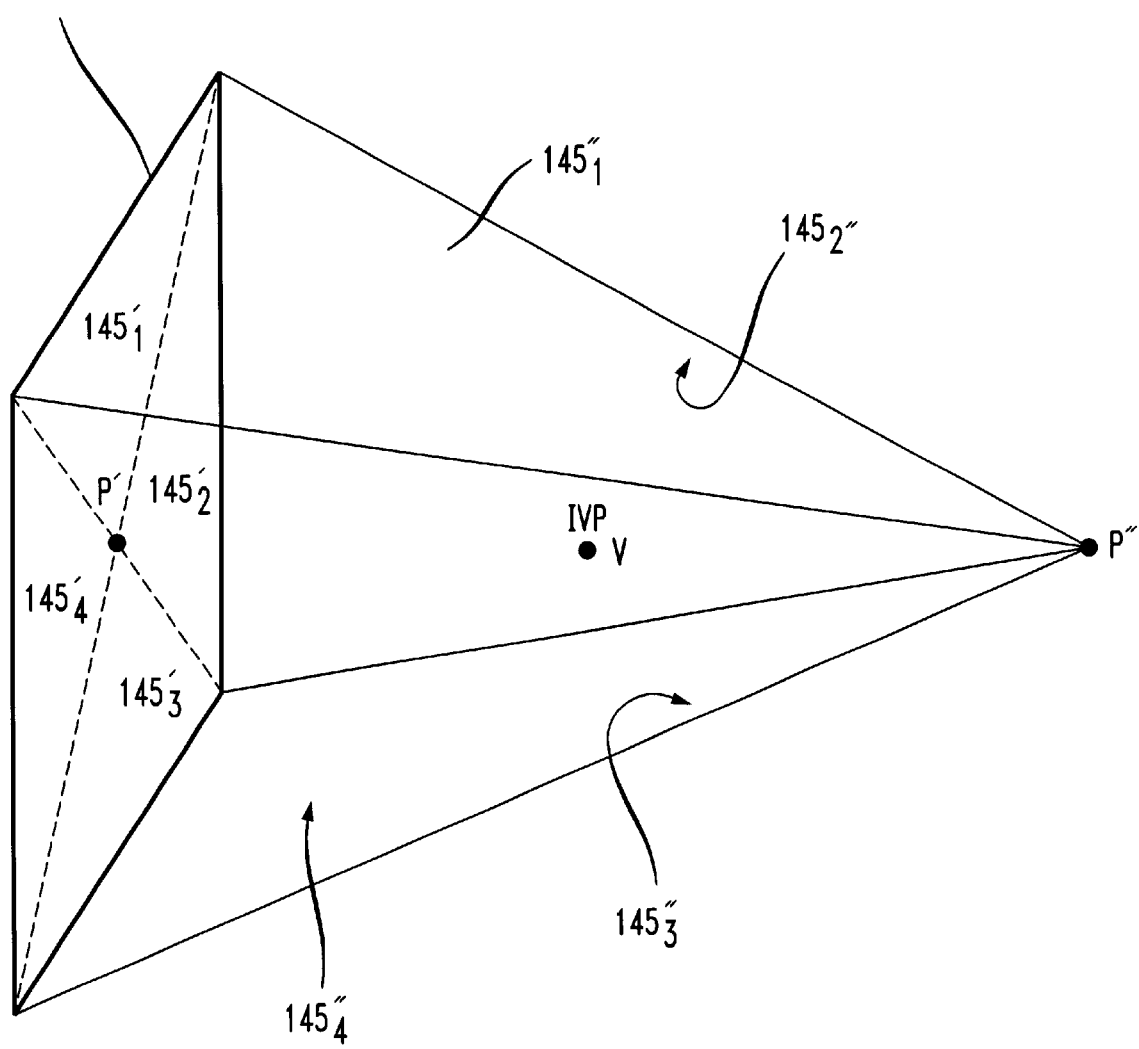
Figure 12:
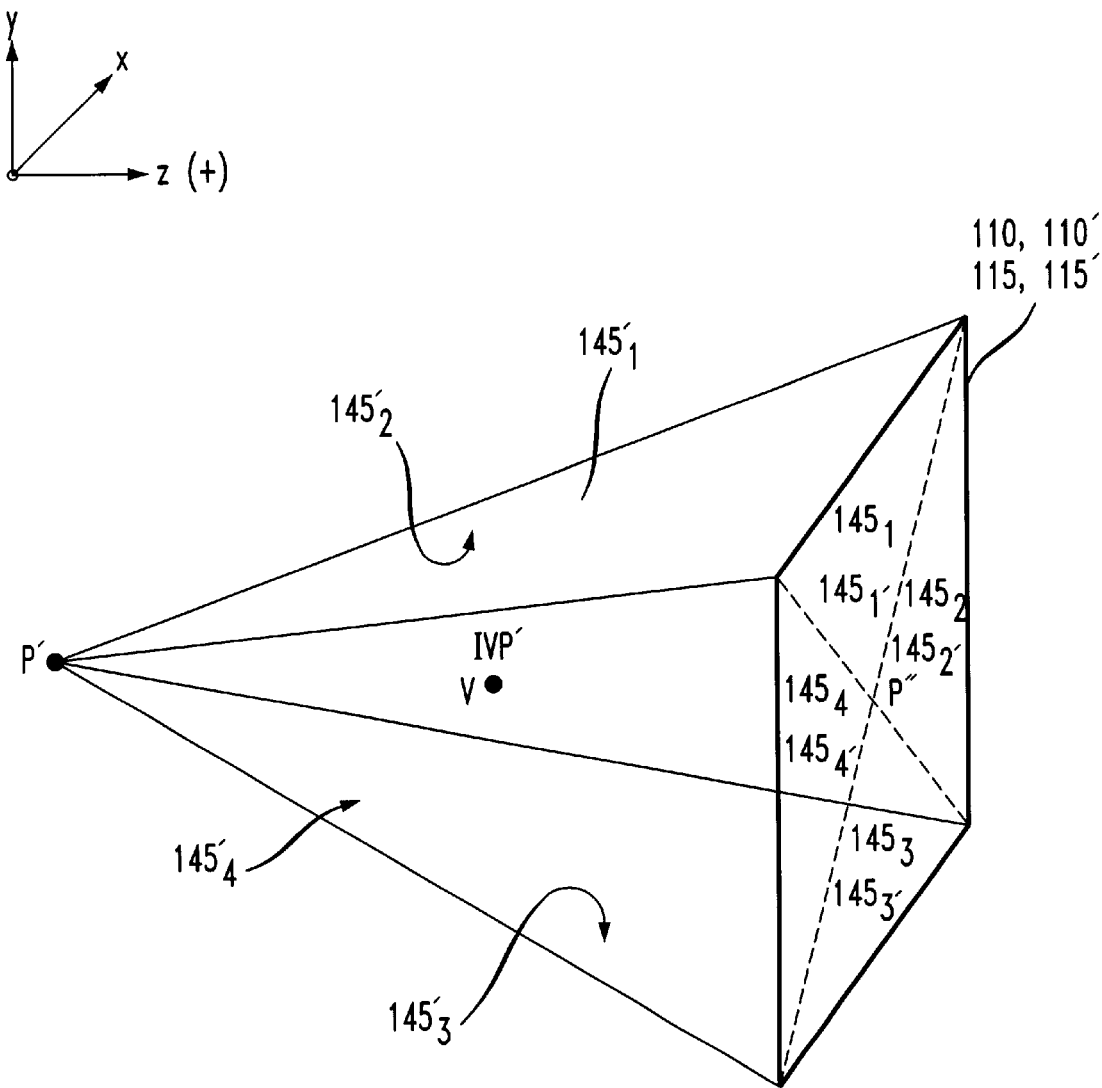

Accordingly, when the two image panels distorts in response to the user's viewpoint, a textured-mapped, octahedral panel structure is formed surrounding the user's view point, V. This latter aspect of the present invention may be more fully appreciated by now referring to FIGS. 10–12. As the user's viewpoint, V, is moved along the z-axis away from two-dimensional image 115, the peaks (P',P'') of each pyramidic structure moves accordingly along the same direction, as shown in FIG. 10. Now referring to FIG. 11, when the user's viewpoint for image 115, however, is located at the image's ideal viewing point, IVP, panels $145'_{1-4}$ then collapse onto panel 110. Similarly, this occurs for panels $145''_{1-4}$ when the user's viewpoint is located at the ideal viewing point IVP', for image 115', as further illustrated in FIG. 12.

In another embodiment of the present invention, a modified pyramidic panel structure may be used to deal with two-dimensional images containing curved roads, streets, paths and other corridor-like images containing multiple rather than a single vanishing point. In this latter case, screen or panel 110 is segmented using multiple vanishing points to form a so called "articulated pyramidic panel structure." The transformations associated with the articulated pyramidic panel structure dynamically distort different portions of two-dimensional image 115 according to viewer positions so as to adjust the different vanishing points of the image with the viewer's movement. Likewise, as the viewer moves from the image's ideal viewing point, these distortions act to limit the discontinuities between two-dimensional image 115 and the surroundings of CG Part 120.

Figure 13:
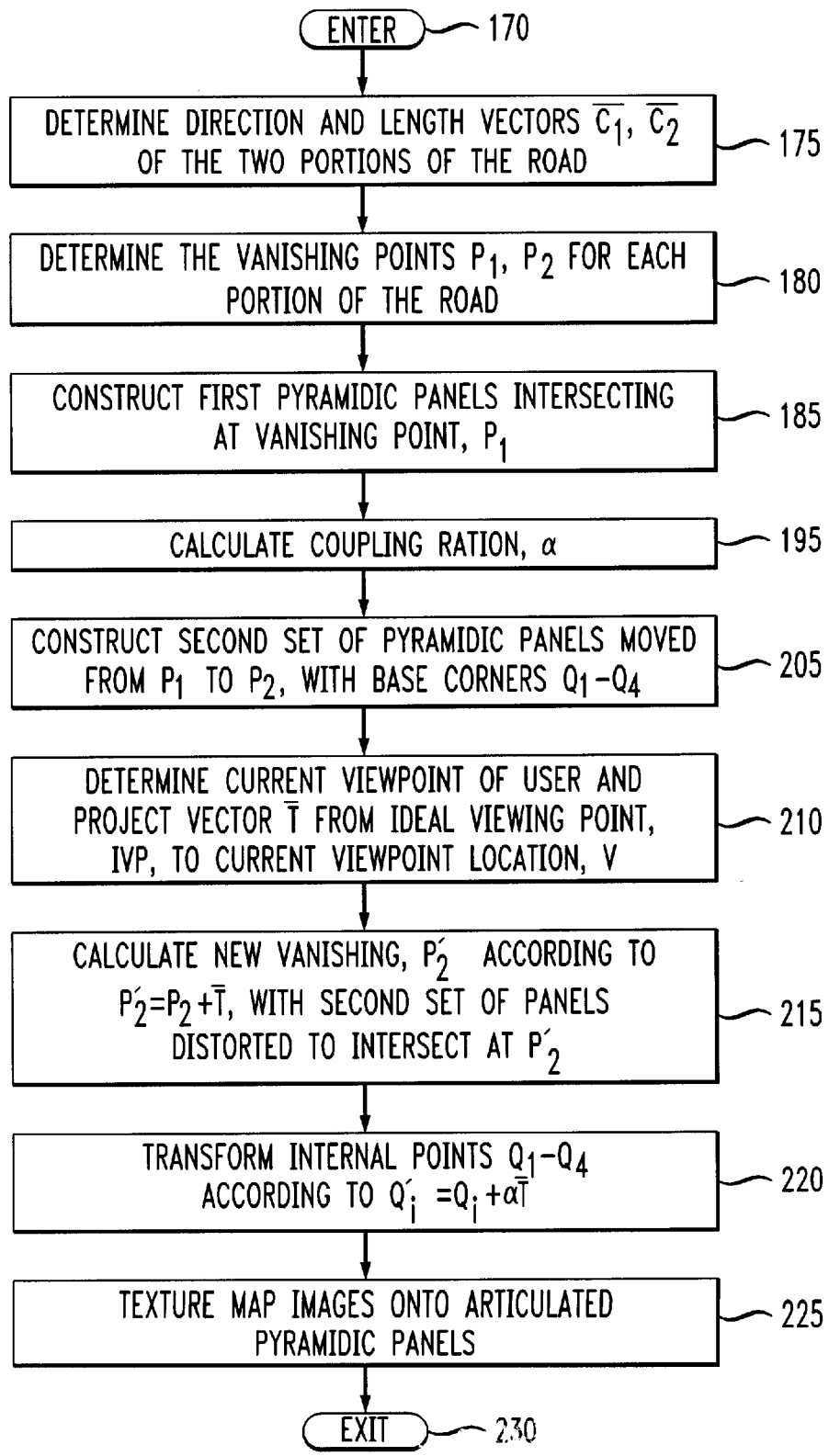
FIG. 13 shows an exemplary process, in accordance with the principles of the invention, for distorting a two-dimensional image using an articulated pyramidic panel structure so as to adjust multiple vanishing points in the image, in accordance with the movement of the user.

FIG. 13 shows an exemplary process in accordance with the principles of the invention for distorting two-dimensional image 115 using an articulated pyramidic panel structure. Again, the process is entered at step 170 whenever it is determined that the viewer's position has changed. In general, curve road 125 is treated as two straight corridors placed end-to-end, extending back from screen or panel 110. Each corridor represents a different portion of road 125 in the three-dimensional space of world 105, with features nearer the center of the image being farther away from the user's viewpoint.

Figure 14:
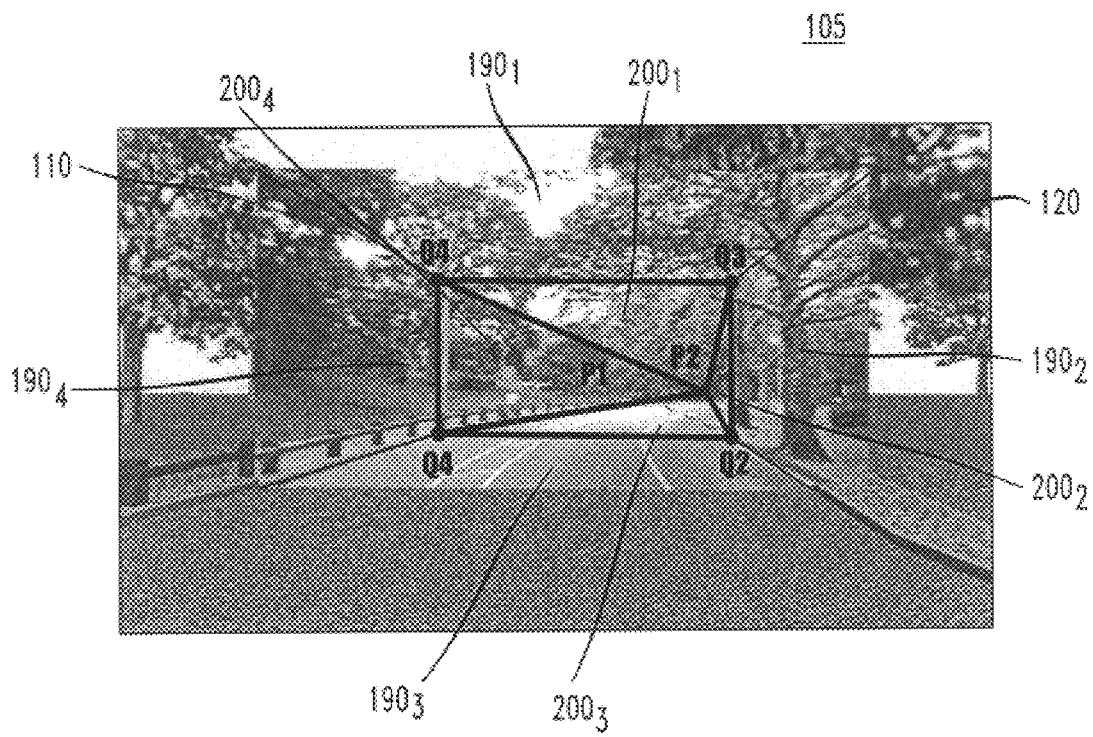
FIG. 14 depicts an example of the articulated pyramidic panel structure of the present invention.

Using the virtual world's road model of the CG Part 105, corresponding directional vectors $C_1$ and $C_2$ of the corridors are determined at step 175. Note that portion of the road nearer to the user's viewpoint is represented by $C_1$, and the portion farther away is represented by $C_2$. Next, in step 180, using the vectors $C_1$ and $C_2$, the corresponding vanishing points $P_1$ and $P_2$ are determined, respectively, for each corridor by projecting those vectors from the image's ideal viewing point, IVP. Alternatively, vanishing points $P_1$ and $P_2$ may be determined visually by the user, or by some other suitable means known in the art. In step 185, using the first corridor's vanishing point, $P_1$, a first set of pyramidic panels $190_{1-4}$ are constructed to intersect at vanishing point, $P_1$, as shown in FIG. 14.

Now at step 195, a coupling ratio $\alpha$ is calculated according to the following equation: $\alpha=l/(l+d)$, where 1 is the length of the first corridor, and d is the distance between the image's ideal view point (IVP) and the base of pyramidic panels $190_{1-4}$. Each line segment connecting a corner of the base to vanishing point $P_1$, is then divided into two segments by a point placed according to the coupling ratio, $\alpha$. More specifically, the length l' of each line segment from the corner of the base of panels $190_{1-4}$ to this point is given by $l'=\alpha l''$, where l" is the total length of the segment between the corner of the panel and the vanishing point, $P_1$. These four points labeled Q1 through Q4 are connected to form the base of a second set of smaller pyramidic panels $200_{1-4}$ embedded within the larger panels (step 205), as further illustrated in FIG. 14. The intersection point of pyramidic panels $200_{1-4}$ is then moved from $P_1$ to vanishing point, $P_2$.

Figure 15:
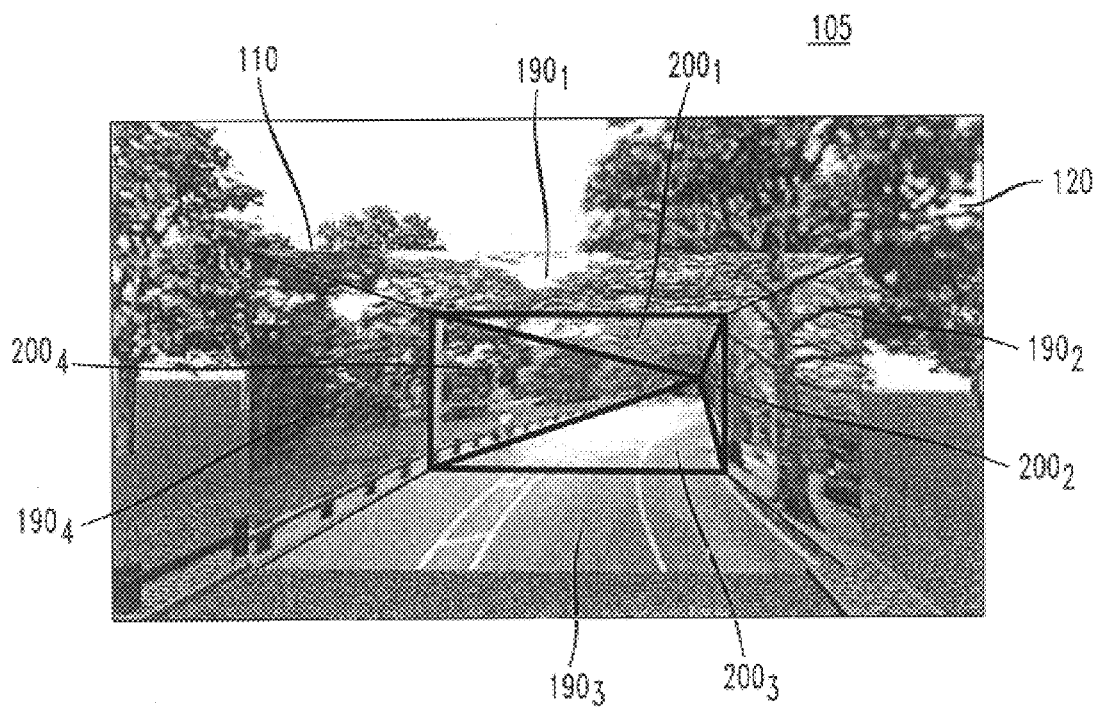
FIG. 15 depicts an example of that which a user sees when a user views the world from a location away from the ideal viewing point of the two-dimensional image, with the use of the articulated pyramidic panel structure of the present invention.

For the articulated pyramidic panel structure, the current viewpoint of the user, V, is determined, and a vector $\overline{T}$ projected from the ideal viewing point, IVP, to the viewer's current location, V (step 210). As the viewer moves, a new vanishing point $P'_2$ is calculated as $P'_2=P_2+\overline{T}$ at step 215, and panels $200_{1-4}$ are then distorted so as to intersect at $P'_2$. As the viewer move, the four internal points Q1 through Q4 are mapped with the viewer's movement to Q1' through Q4', respectively, in accordance with the following relationship: $Q'_i=Q_i+\alpha\overline{T}$, at step 220. Note that doing so, accordingly distorts the first set of pyramidic panels $190_{1-4}$. At step 225, the corresponding images in original panels are then texture-mapped into articulated pyramidic panels $190_{1-4}$ and $200_{1-4}$, which have been distorted in accordance with the movement of the viewer. Note that to unambiguously texture-map onto panels $190_{1-4}$, these panels are each subdivided into two triangular subregions and then texture-mapped. Shown in FIG. 15 is image 115 seen from a location away from the image's ideal viewing point, using the articulated pyramidic panel structure of the present invention.

Note that the above articulated pyramidic panel structure may also use more than two sets of pyramidic panel structures. Instead of treating the curve road as two straight corridors, multiple corridors may be employed, each placed end-to-end and extending back from screen or panel 110. Likewise, each corridor represents a different portion of road 125 in the three-dimensional space of world 105, with features nearer the center of the image being farther away from the user's viewpoint. In such a case, each set of articulated pyramidic panels are formed reitererately using the above described procedure.

Figure 16:
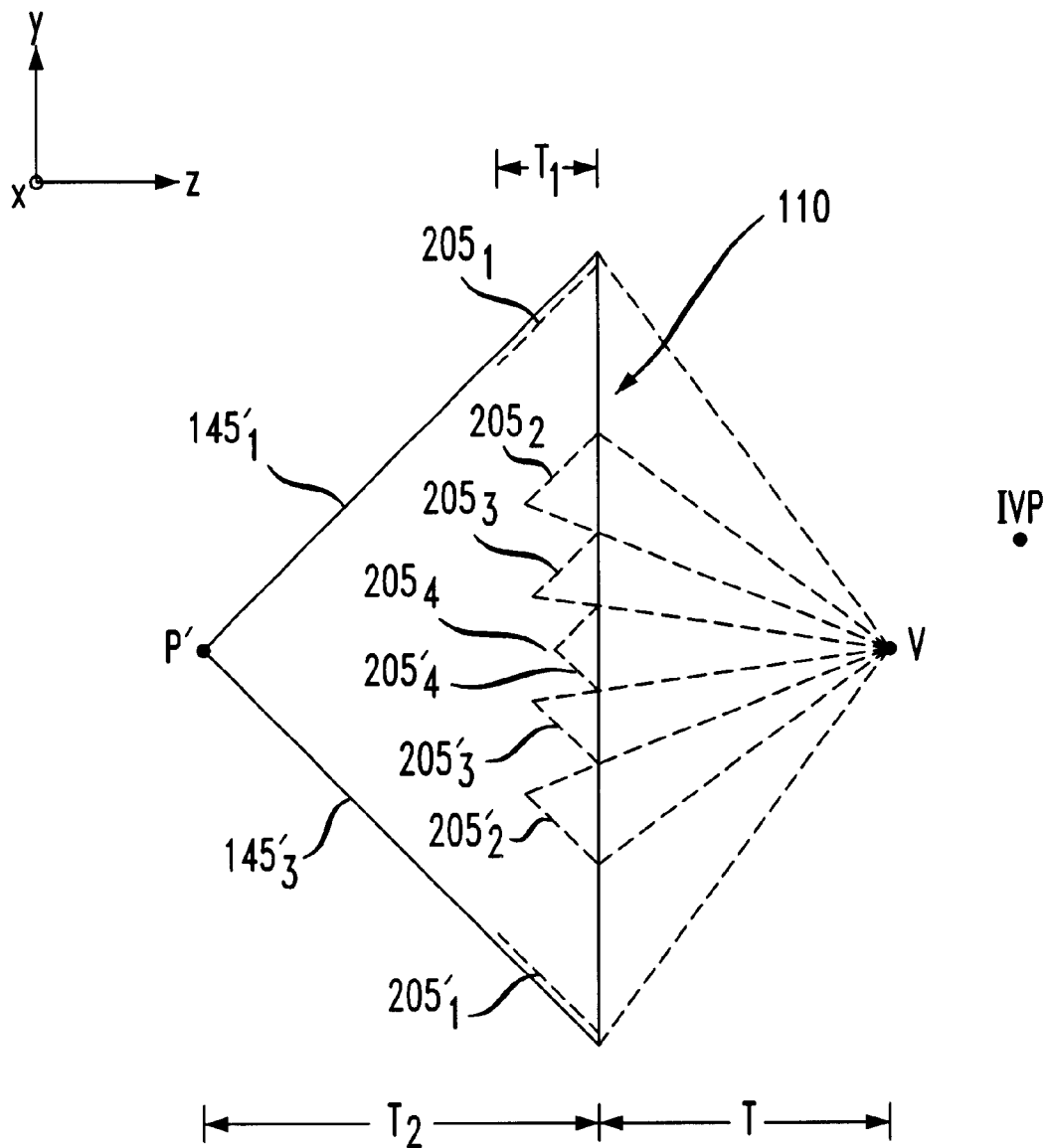
FIGS. 16 and 17 depict side and front views, respectively, of the pyramidic panel structure of FIG. 5 with each panel segmented into a plurality of sections.
Figure 17:
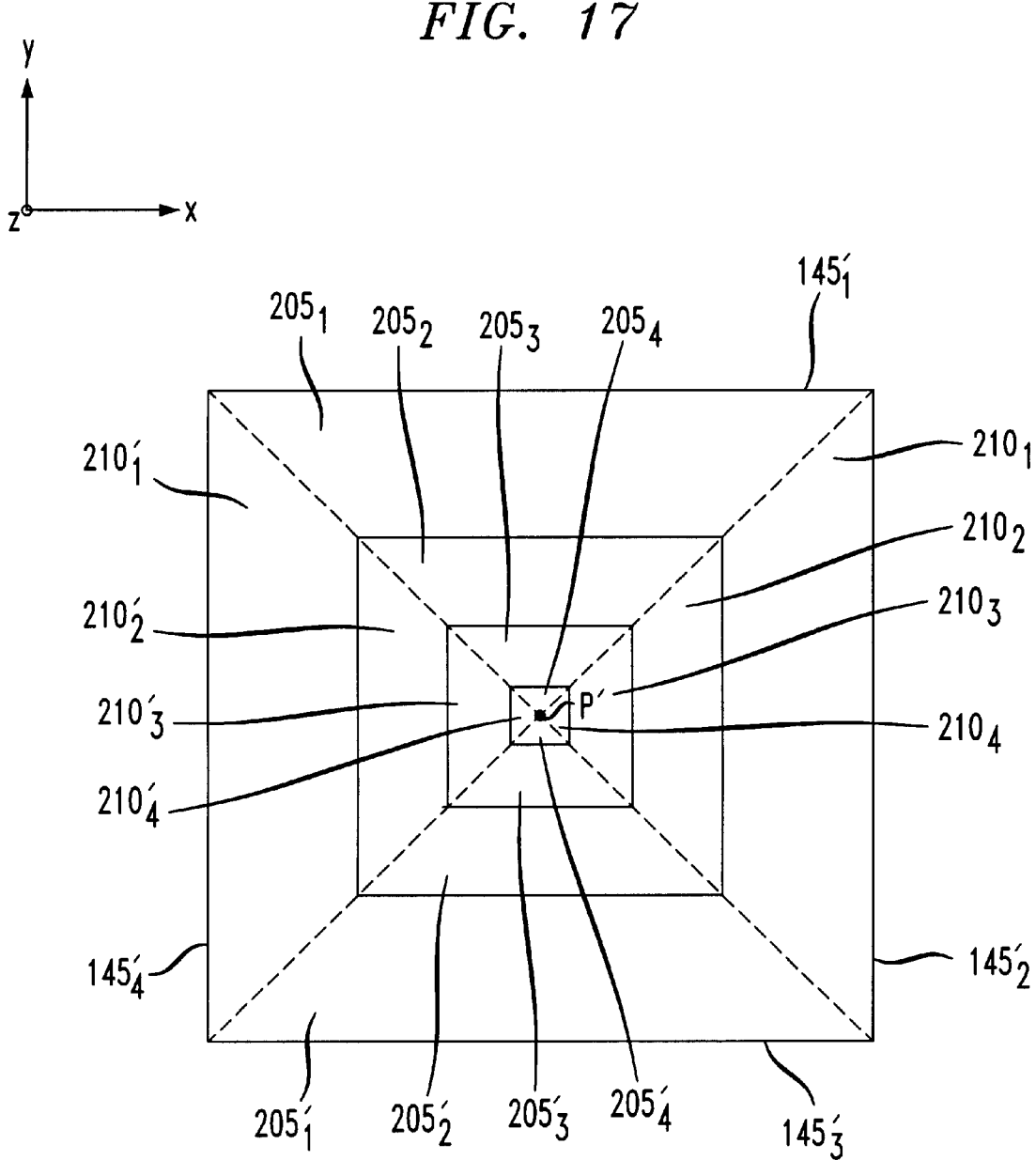

Referring to FIGS. 16 and 17, there is shown a third embodiment of the present invention which is similar to that of FIG. 5 and in which "pyramidic panels" $145'_1$, $145'_2$, $145'_3$ and $145'_4$ have been now multi-segmented into sections $205_{1-4}$, $210_{1-4}$, $205'_{1-4}$, and $210'_{1-4}$, respectively, with the images in original panels $145_{1-4}$ then texture-mapped into the corresponding translated sections of the pyramidic panel structure, as discussed herein below. It should be recalled that the pyramidic panel structure represents the three-dimensional mapping (x,y,z) of two-dimensional image 115 onto image screen or panel 110 (x,y). Advantageously, the embodiment of FIGS. 16–17 minimizes the depth profile of the pyramidic panel structure along the z-axis. Unlike the embodiment of FIG. 5, the depth profile of this third embodiment does not substantially vary with changes in the user's viewpoint, V. In the exemplary embodiment of FIG. 5, recall that distorting image 115 so as to move the vanishing point from P to P' results in the pyramidic panel structure forming a four-sided pyramid. The base of the pyramid is fixed and corresponds to original screen or panel 110, with its peak located at P' and moves in concert with the viewer's current location, V. As the user's viewpoint moves along the z-axis closer to and farther from two-dimensional image 115, the image's new vanishing point P' moves farther from and closer to the user's viewpoint, respectively. This latter movement causes the depth profile along the z-axis of the pyramidic panel structure to vary accordingly. Unfortunately, this variation in depth profile can undesirably and/or unexpectedly occlude from the user's view objects in the virtual world, or cause objects to occlude other features in the virtual world inasmuch as the corresponding images in the panels are distorted, as discussed above herein.

Figure 18:
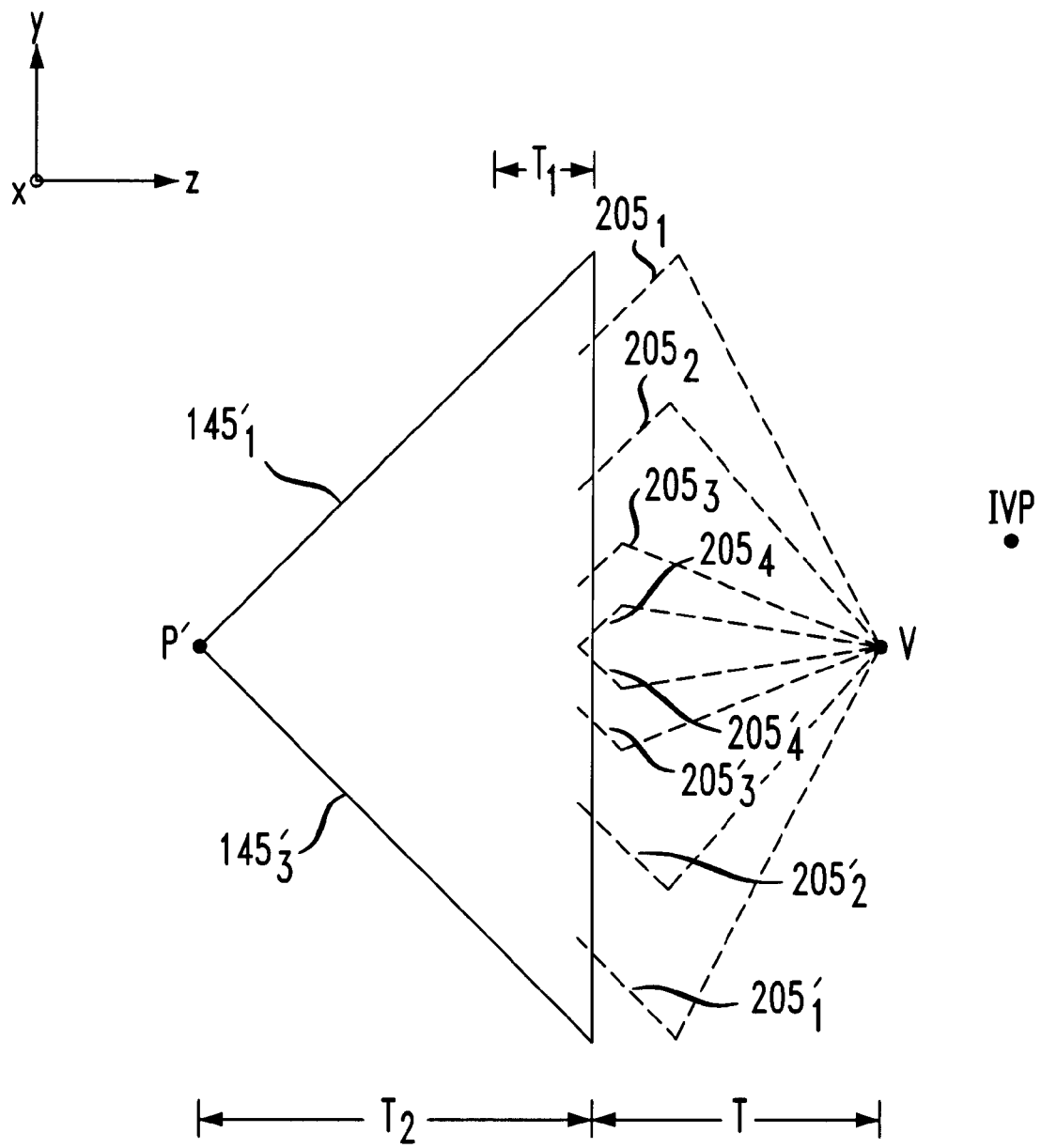
FIG. 18 depicts the pyramidic panel structure of FIG. 5, with each panel segmented into a plurality of sections having its centers located on the surface of a predetermined plane.

To obviate the aforementioned problem, "pyramidic panels" $145'_1$, $145'_2$, $145'_3$ and $145'_4$ have been multi-segmented into sections $205_{1-4}$, $210_{1-4}$, $205'_{1-4}$, and $210'_{1-4}$ respectively. Each section is then translated along the z-axis to a predetermined distance towards or away from the user's viewpoint, V, but importantly of the same orientation as the original section. For example, segmented sections $205_{1-4}$ and $205'_{1-4}$ may each have one of its outer edge along the x-axis translated to lie on the x,y plane of screen or panel 110, as shown in phantom in FIG. 16. As the user moves to a new viewpoint, each section in effect pivots about that edge along the x-axis, which edge lies on the surface of panel 110. Similarly, section $210_{1-4}$ and $210'_{1-4}$ may each have one of it outer edge along the y-axis lying on the surface of panel 110. Alternatively, sections $205_{1-4}$ and $205'_{1-4}$ may be centered along panel 110, as depicted in FIG. 18. Likewise, sections $210_{1-4}$ and $210'_{1-4}$ may be similarly translated, but for the sake of clarity are not shown in FIGS. 16 and 18.

Still further, each of sections $205_{1-4}$ and $205'_{1-4}$ may in effect be rotated or pivoted about its other edge along the x-axis as the user moves to a new viewpoint, V, or, in general, about an axis parallel with an edge along the x-axis of the corresponding section. Again, this latter axis may, but does not have to, lie on the surface of panel 110. Regardless of the segmenting method chosen, however, translating each section towards or away from the user's viewpoint significantly reduces the depth profile of the pyramidic panel structure along the z-axis, such as depicted in FIG. 18 from, for example, $T_{2\ to\ T1}$.

Figure 19:
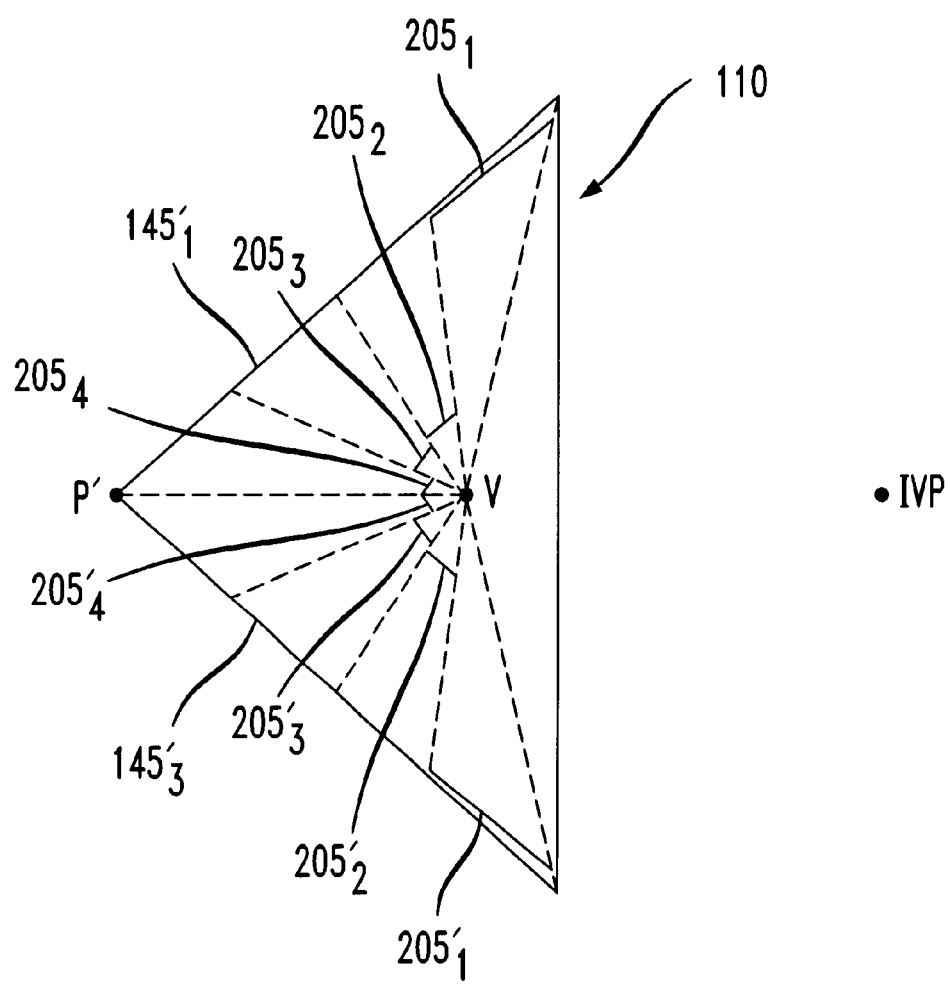
FIG. 19 depicts the pyramidic panel structure of FIG. 5, with each panel segmented into a plurality of sections and each section translated a different distance toward the user's view point, V.

In still another embodiment of the present invention, sections $205_{1-4}$ and $205'_{1-4}$ may each be translated a different distance along the z-axis, as illustrated in FIG. 19. Although not shown, sections $210_{1-4}$ and $210'_{1-4}$ may likewise be translated. Those skilled in the art will readily understand that doing so advantageously allows the user's viewpoint, V, to extend in front of panel 110 inasmuch as segmented sections corresponding to the image's center may be offset and located closer to the user's viewpoint, V, than the outer sections.

Also, note that segmenting the pyramidic panel structure into a greater number of smaller sections accordingly only further reduces the depth profile, which asymptotically approaches a zero thickness. It is contemplated that the number of sections that the panel structure is divided into may be chosen empirically based on image content as well as the user's range of movement within the virtual world. Preferably, however, the panel structure is dynamically segmented in a reiterative manner. For example, once a user has chosen the maximum desired depth for the panel structure along the z-axis to minimize occlusion, each panel is then reiteratively segmented into a greater number of smaller sections until the depth profile is reduced to the maximum depth profile desired.

In accordance with the principles of the invention, it should be clearly understood, however, that to maintain the apparent integrity of two-dimensional image 115 when texture-mapping the image onto the segmented sections, each segmented sections $205_{1-4}$, $205'_{1-4}$, $210_{1-4}$ and $210'_{1-4}$ is scaled accordingly with respect to the user's current viewpoint, V, so as to appear to be of the same size as the original corresponding section. This scaling or transform is given by:

$$S_t = S_p \frac{T_t}{T_p}$$

where $S_p$ is the size of the original pyramidic section; $S_t$ is the size of the translated, segmented pyramidic panel section; $T_p$ is distance to the original pyramidic section from the user's viewpoint, V; and $T_t$ is the distance to the translated, segmented pyramidic section. In other words, each segmented, translated section is scaled by the ratio $$\frac{T_t}{T_p}.$$

Of course, as the user moves within the world, pyramidic panels $145_{1-4}$ are accordingly re-segmented, translated, and then scaled with respect to the user's new viewpoint, V. Then, the images in original panels $145_{1-4}$ are again accordingly texture-mapped into the corresponding translated sections $205_{1-4}$, $205'_{1-4}$, $210_{1-4}$ and $210'_{1-4}$ of the pyramidic panel structure.

Figure 20:
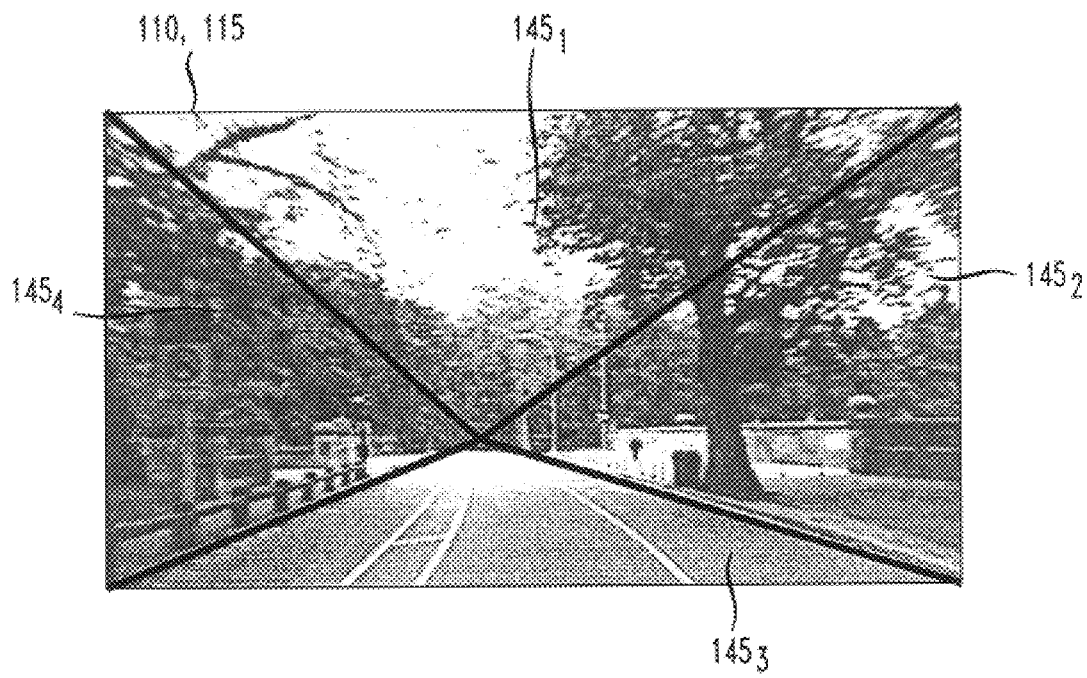
FIG. 20 depicts the screen of the pyramidic panel structure of the present invention segmented into four triangular sections onto which the corresponding portions of the two-dimensional image is displayed.
Figure 21:
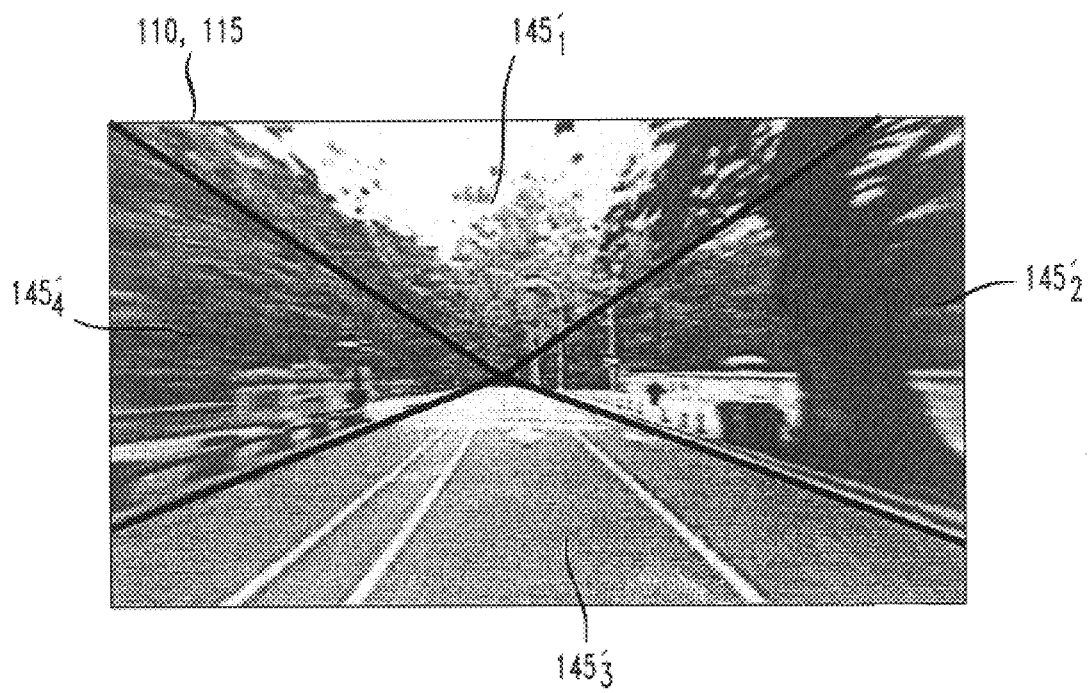
FIG. 21 depicts the screen of FIG. 20 with the corresponding portions of the image textured-mapped onto the pyramidic panels in accordance with the present invention.

In the above embodiments, distorting two-dimensional image 115 according to the movement of the user's viewpoint results in different portions of the image being accordingly "expanded" or "compressed" when texture-mapping image 115 onto the corresponding pyramidic panels, as discussed above herein. Also, as the user's viewpoint moves along the z-axis closer to two-dimensional image 115, the image is accordingly scaled or "enlarged" to make objects in the image appear closer to the user. Note that doing so requires scaling the x and y components of the objects accordingly as a function of their distance (z-axis) to the user's viewpoint. To illustrate these later aspects of the present invention, shown in FIG. 20 is screen 110 with two-dimensional image 115 displayed therein having a resolution of M×N pixels, e.g., 1200×1200. Now, as shown in FIG. 21, moving along the z-axis closer to the center of the image and then texture-mapping the corresponding portions of image 115 onto pyramidic panels $145'_{1-4}$ requires enlarging and distorting the image such that only a small center portion of the enlarged and distorted image is displayed on screen 110, which in effect lowers the observable image resolution. This is so since the image only has a finite number of pixels, and fewer pixels are displayed on the same size screen. One solution to this latter problem is using high resolution images which allows the user to travel towards the center of the image without losing image quality, but it results in the perimeter of the image having a resolution higher that needed since enlarging the image causes the perimeter of the image to be outside the field of view of the observer and, therefore not displayed on the screen. This higher than needed resolution requires more memory to store image 115 as well as additional computational time to perform the texture mapping, among other things. Of course, using lower resolution images would require less memory and computational time, but it typically leads to poor image quality near the center of image where the image is typically enlarged or distorted the greatest.

Figure 22:
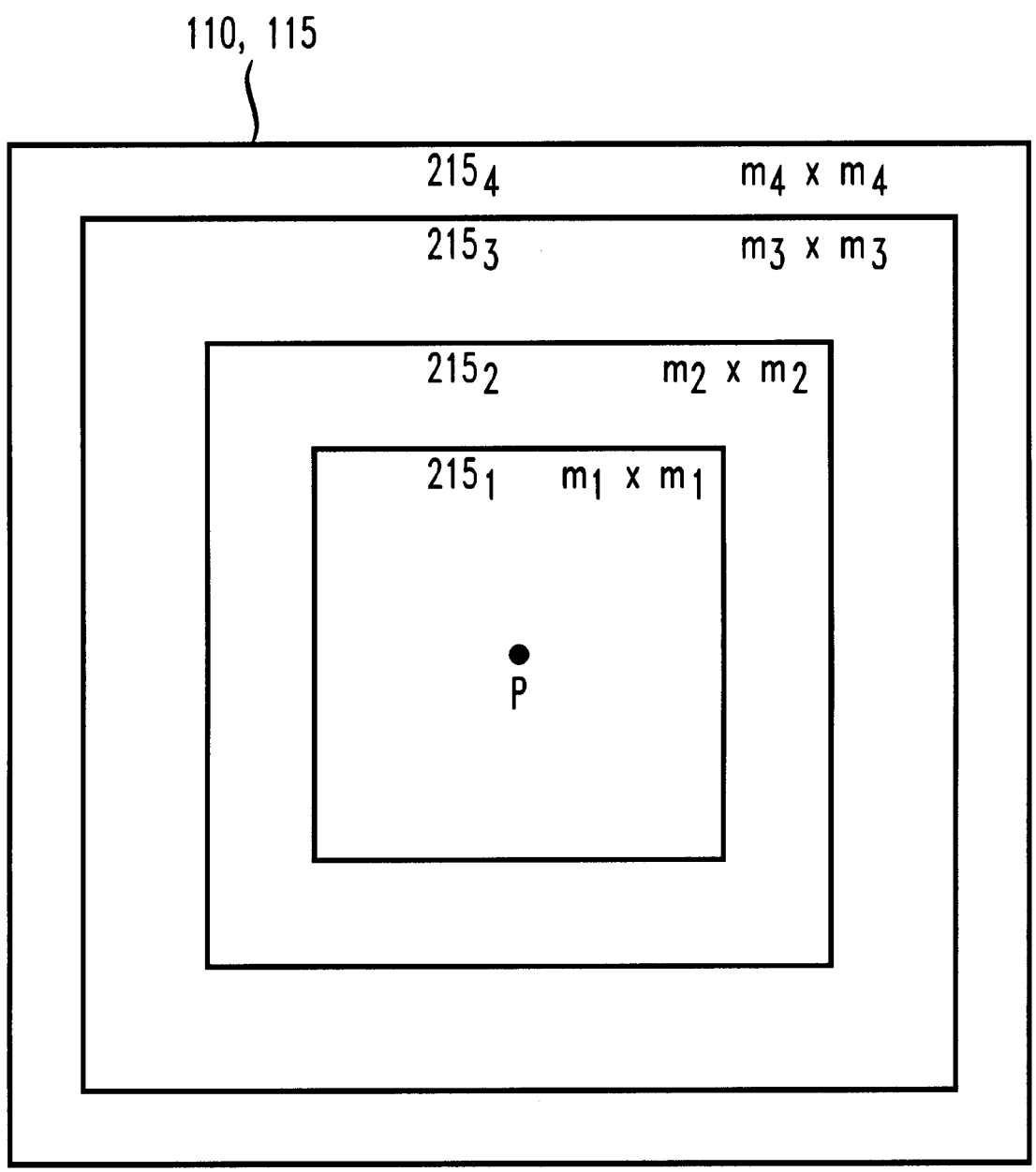
FIG. 22 depicts the screen of FIG. 20 with the two-dimensional image segmented into a plurality of sections in accordance with another aspect of the present invention.

Referring to FIG. 22, there is shown still another embodiment of the present invention which obviates the aforementioned problem by using a two-dimensional image having a "hierarchical image resolution," thereby allowing segmented portions of the image to have a resolution according to its location within the image. In this manner, a fine resolution can be used for portions of image 115 near the center of the image whereas a coarse resolution can be used for the perimeter, thereby minimizing the total texture-map size or pixel-map size. It should be clearly understood that this hierarchical image resolution is equally applicable to any one of the above pyramidic panel structures discussed herein above. In this aspect of the present invention, two-dimensional image 115 has been segmented into resolution regions $215_{1-4}$ each having a rectangular shape, although other shapes are readily adaptable for the purposes of this invention. The corresponding portions of image 115 within resolution regions $215_{1-4}$ have different resolutions such that portions of the image closer to the center of the image have a finer resolution than portions farther away. For example, resolution regions $215_{1-4}$ may have image pixel resolutions of $m_1 \times m_1$, $m_2 \times m_2$, $m_3 \times m_3$ and $m_4 \times m_4$, respectively, where $m_1 \geq m_2 \geq m_3 \geq m_4$. In this manner, distorting or enlarging portions of the image near the center of the image or where the image's vanishing point is typically located does not substantially affect the observed image resolution inasmuch as a greater number of pixels are contained in the image.

It is contemplated that the number of resolution regions that image 115 is segmented into as well as the pixel resolution therein may be, for example, chosen empirically based on image content as well as the user's range of movement within the virtual world. For example, portions of the image near the center can have a resolution of 4800× 4800, while portions near the perimeter only a resolution of 1200×1200. Furthermore, the resolution for resolution regions $215_{1-4}$ may be dynamically chosen according to the amount of distortion or enlargement performed on the image. That is, each region is allocated a finer resolution with a greater distortion or enlargement, and vice-a-versa.

Of course, various computer storage techniques may be used to set the image resolution within regions $215_{1-4}$. For example, image 115, typically a still photograph, picture or video frame, may be captured with a resolution of 4800× 4800 pixels or greater, and then a subset of those pixels used to achieve a desired lower resolution.

The foregoing merely illustrates the principles of the invention. It will thus be appreciated that those skilled in the art will be able to devise various arrangement which, although not explicitly describe or shown herein, embody the principles of the invention and are included within its spirit and scope.

What is claimed is:

1. A method for use in processing a view of a three-dimensional world in which said world is represented by a first two-dimensional image for viewing objects located in a first portion of a plenoptic view of said world, and represented by a second two-dimensional image for viewing a second portion of the plenoptic view of said world, said second portion being the remaining portion of the plenoptic view of said world, comprising the steps of:

determining the current user's viewpoint within the three-dimensional world, each of said first and second two-dimensional images being such that features closer to a predetermined point of the corresponding image are farther away from the user's viewpoint so as to give a portion thereof a vanishing point;

distorting the first and second two-dimensional images so as to move the vanishing points of the portions of the corresponding two-dimensional images according to the current user's viewpoint, V; and as the user moves within the three-dimensional world, repeating the above step so as to limit discontinuities between said first and second two-dimensional images, and the computer graphics.

2. The method as defined in claim 1 wherein said predetermined point is substantially near the center of the corresponding two-dimensional image.

3. The method as defined in claim 1 wherein said predetermined point is substantially near the vanishing point of the corresponding two-dimensional image.

4. The method as defined in claim 1 wherein each of said first and second two-dimensional images is a frame of a video.

5. The method as defined in claim 1 wherein each of said first and second two-dimensional images is a still picture.

6. The method as defined in claim 1 further comprising the step of calibrating said first and second two-dimensional images as a function of the dimensions of the surroundings within the world.

7. A method for use in processing a view of a three-dimensional world, comprising the steps of:

representing said world by first and second two-dimensional images for viewing objects located in first portion and second portions of a plenoptic view of said world, respectively, said first and second two-dimensional images each including an object depicted in perspective, said first and second two-dimensional images being such that features of the object closer to a predetermined point of the corresponding image are farther away from a user's viewpoint;

when viewing objects located in said first and second portions of the plenoptic view of said world,
(a) determining a vector, $\overline{C}$, corresponding to the direction of the perspective object in the corresponding two-dimensional image;
(b) projecting towards an image panel the vector, $\overline{C}$, from the corresponding two-dimensional image's ideal viewing point, IVP, the intersection of said vector, $\overline{C}$, with the image panel being denoted as the image's vanishing point, P;
(c) segmenting the image panel into triangular regions intersecting at the corresponding image's vanishing point, P;
(d) determining the current viewpoint, V, of the user and projecting a vector, $\overline{T}$, from the corresponding image's ideal viewing point, IVP, to the current viewpoint, V;
(e) determining a new vanishing point for the corresponding two-dimensional image in accordance with the following relationship $P'=P+\overline{T}$;
(f) distorting the triangular regions in the space of the three-dimensional world such that they intersect at the new vanishing point, P'; and
(g) texture-mapping the corresponding two-dimensional image in the triangular regions onto said distorted triangular regions; and as the user moves within the world repeating the above steps so as to limit discontinuities between said two-dimensional images, and the computer graphics.

8. The method as defined in claim 7 wherein said predetermined point is substantially near the center of the corresponding two-dimensional image.

9. The method as defined in claim 7 wherein said predetermined point is substantially near the vanishing point of the corresponding two-dimensional image.

10. The method as defined in claim 7 wherein each of said first and second two-dimensional images is a frame of a video.

11. The method as defined in claim 7 wherein each of said first and second two-dimensional images is a still picture.

12. The method as defined in claim 7 further comprising the step of calibrating said first and second two-dimensional images as a function of the dimensions of the surroundings within the world.

13. An apparatus for use in processing a view of a three-dimensional world in which said world is represented by a first two-dimensional image for viewing objects located in a first portion of a plenoptic view of said world, and represented by a second two-dimensional image for viewing objects located in a second portion of the plenoptic view of said world, said second portion being the remaining portion of the plenoptic view of said world, said apparatus comprising:

means for determining the current user's viewpoint within the three-dimensional world, each of said first and second two-dimensional images being such that features closer to a predetermined point of the corresponding image are farther away from the user's viewpoint so as to give a portion thereof a vanishing point; and when viewing objects in the first and second portions of the plenoptic view of said world, and the user moves within the three-dimensional world, means for repeatingly distorting the first and second two-dimensional images, respectively, so as to move the vanishing points of the portions of the corresponding two-dimensional images according to the current user's viewpoint.

14. The method as defined in claim 13 wherein said predetermined point is substantially near the center of the corresponding two-dimensional image.

15. The method as defined in claim 13 wherein said predetermined point is substantially near the vanishing point of the corresponding two-dimensional image.

16. The method as defined in claim 13 wherein each of said first and second two-dimensional images is a frame of a video.

17. The method as defined in claim 13 wherein each of said first and second two-dimensional images is a still picture.

18. The method as defined in claim 13 further comprising the step of calibrating said first and second two-dimensional images as a function of the dimensions of the surroundings within the world.

19. A method for use in processing a view of a three-dimensional world in which said world is represented by a first two-dimensional image mapped on a first panel for viewing objects located in a first portion of a plenoptic view of said world, and represented by a second two-dimensional image mapped on a second panel for viewing objects located in a second portion of the plenoptic view of said world, said second portion being the remaining portion of the plenoptic view of said world, comprising the steps of:

determining the current viewpoint of the user, V;

dividing the first and second panels into triangular regions;

distorting the triangular regions of said first and second panels to form pyramidic panels such that a corresponding vanishing point, P, of a portion of the corresponding two-dimensional image moves as a function of the current viewpoint of the user;

texture-mapping said first and second two-dimensional images onto the plurality of sections of the corresponding pyramidic panels; and as the user moves within the three-dimensional world, repeating the above steps so as to limit discontinuities between said first and second two-dimensional images, and the computer graphics.

20. The method as defined in claim 19 wherein said predetermined point is substantially near the center of the corresponding two-dimensional image.

21. The method as defined in claim 19 wherein said predetermined point is substantially near the vanishing point of the corresponding two-dimensional image.

22. The method as defined in claim 19 further comprising displaying the corresponding distorted two-dimensional image merged with the first portion of said world that is modeled as computer graphics.

23. The method as defined in claim 19 wherein each of said first and second two-dimensional images is a frame of a video.

24. The method as defined in claim 19 wherein each of said first and second two-dimensional images is a still picture.

25. The method as defined in claim 19 further comprising the step of calibrating said first and second two-dimensional images as a function of the dimensions of the surroundings within the world.

\* \* \* \* \*